(12) United States Patent
Honda et al.

(10) Patent No.: US 6,999,278 B2
(45) Date of Patent: *Feb. 14, 2006

(54) CLEANING TAPE WITH SURFACE PROTRUSIONS FORMED BY PARTICLES OF PREDETERMINED SIZE/DENSITY AND NON-MAGNETIC METAL EVAPORATED FILM OF PREDETERMINED THICKNESS

(75) Inventors: Hidetoshi Honda, Miyagi (JP); Takashi Kanou, Miyagi (JP); Hitoshi Wako, Miyagi (JP); Satoshi Sekino, Miyagi (JP); Ryoichi Hiratsuka, Miyagi (JP)

(73) Assignee: Sony Corporation, Tokyo (JP)

( * ) Notice: Subject to any disclaimer, the term of this patent is extended or adjusted under 35 U.S.C. 154(b) by 218 days.

This patent is subject to a terminal disclaimer.

(21) Appl. No.: 10/463,370

(22) Filed: Jun. 17, 2003

(65) Prior Publication Data
US 2004/0257703 A1    Dec. 23, 2004

(30) Foreign Application Priority Data
Jun. 19, 2002    (JP)    ............................ 2002-179112

(51) Int. Cl.
*G11B 5/41*    (2006.01)
(52) U.S. Cl. .................................. 360/128; 15/DIG. 12
(58) Field of Classification Search ................ 428/144, 428/143; 15/DIG. 12; 360/128, 137
See application file for complete search history.

(56) References Cited

U.S. PATENT DOCUMENTS 5,847,905 A * 12/1998 Inaba et al. .................. 360/128
6,800,374 B1 * 10/2004 Honda et al. ................ 428/457

FOREIGN PATENT DOCUMENTS

| JP | 02126411 A | * | 5/1990 |
| JP | 08315327 A | * | 11/1996 |
| JP | 10247313 A | * | 9/1998 |

* cited by examiner

*Primary Examiner*—Craig A. Renner
(74) *Attorney, Agent, or Firm*—Robert J. Depke; Trexler, Bushnell, Giangiorgi, Blackstone & Marr, Ltd.

(57) ABSTRACT

There is provided a cleaning tape capable of attaining sufficient cleaning effects while preventing electrostatic discharge damage to magnetoresistive heads or changes in reproduced output due to excessive head wear. The cleaning tape includes a non-magnetic substrate 1, surface protrusions 6 formed on the non-magnetic substrate 1 with particles 2 having a particle diameter of 10 to 40 nm at a density of $300 \times 10^4$ to $5000 \times 10^4$ mm$^2$, a metal evaporated film 3 (preferably an electrically conductive layer such as an alloy layer containing Co as a primary component, an Al layer or the like) having a thickness of 10 to 200 nm and an inorganic protection film 4 having a thickness of 3 to 50 nm formed on the metal evaporated film 3.

15 Claims, 16 Drawing Sheets

CLEANING TAPE WITH SURFACE PROTRUSIONS FORMED BY PARTICLES OF PREDETERMINED SIZE/DENSITY AND NON-MAGNETIC METAL EVAPORATED FILM OF PREDETERMINED THICKNESS

CROSS REFERENCE TO RELATED APPLICATIONS

The present document claims priority to Japanese Priority Document JP 2002-179112, filed in the Japanese Patent Office on Jun. 19, 2002, the entire contents of which are incorporated herein by reference to the extent permitted by law.

BACKGROUND OF THE INVENTION

1. Field of the Invention

The present invention relates to a cleaning tape having a metal magnetic thin-film or a metal thin-film formed through vapor deposition.

2. Description of the Related Art

In the field of, for example, video tape recorders (VTRs), there are strong needs for improving recording density in order to obtain high quality images. The degradation of picture quality due to the accumulation of dirt on the surface across which the head slides becomes more prominent as the recording density becomes higher, the wavelength shorter and the tracks narrower. This makes cleaning tapes essential for general users to maintain the system in good conditions. High cleaning performance is required of cleaning tapes.

In digital magnetic recording systems, it is typical to employ magnetoresistive (MR) heads or giant magnetoresistive (GMR) heads in order to achieve higher recording density. It is believed that no electrostatic discharge damage takes place with inductive type heads which have been used conventionally. However, magnetoresistive heads such as MR heads (AMR (anisotropic magnetoresistive) heads), GMR heads, or tunnel magnetoresistive (TMR) heads are susceptible to electrostatic discharge damage.

GMR heads and TMR heads are even more susceptible to electrostatic discharge damage as compared to MR heads. Electrostatic discharge damage occurs at about 100 volts in MR heads, whereas electrostatic discharge damage in GMR heads occurs at about 30 volts and at about 30 to 50 volts in TMR heads. In order to protect MR heads and the like from electrostatic discharge damage due to static buildup in the cleaning tape itself, it is necessary that the electrical resistivity of the surface of the cleaning tape, which contacts the head, be $1\times10^7$ $\Omega/inch^2$ or below.

On the other hand, if the electrical resistivity of the cleaning tape is too low, leakage current from outside that reaches the head by way of the cleaning tape may lead to electrostatic discharge damage to MR heads and the like. In order to prevent such electrostatic discharge damage to MR heads and the like that occur with the cleaning tape as a conductor, it is necessary that the electrical resistivity of the cleaning tape be $1\times10^3$ $\Omega/inch^2$ or above.

It is preferable that the electrical resistivity of the tape be high in order to prevent electrostatic discharge damage due to a large current flowing momentarily into the head. As such, the electrical resistivity of a cleaning tape for GMR heads is set slightly higher than the electrical resistivity of a cleaning tape for MR heads. Specifically, the electrical resistivity of a cleaning tape for MR heads is set at about $1\times10^3\sim1\times10^6$ $\Omega/inch^2$, while the electrical resistivity of a cleaning tape for GMR heads is set at about $1\times10^3\sim1\times10^7$ $\Omega/inch^2$, preferably at about $1\times10^6$ $\Omega/inch^2$.

In magnetoresistive heads such as MR heads and GMR heads, the magnetic resistance varies with the depth of the effective surface of the head. Since the output of a magnetoresistive head depends on the magnetic resistance, as it wears and the magnetic resistance changes, the reproduced output waveform becomes larger as compared to before wearing. When the change in magnetic resistance exceeds a certain value, the adjustment of a head amplifier adjusted with an initial value is shifted, and the reproduced waveform becomes non-linear. It is therefore required that wearing be kept to a minimum in magnetoresistive heads.

Conventionally, as cleaning tapes for magnetic heads, coated type tapes, in which a non-magnetic substrate is coated with a magnetic coating including ferromagnetic particles and a binder, have been used. A coated type cleaning tape is disclosed in, for example, Japanese unexamined patent publication no. 2000-57541.

In such a coated type cleaning tape, a magnetic layer formed by applying a magnetic coating contains an electrically non-conductive binder and additives. It is therefore impossible to reduce the electrical resistivity below $1\times10^7$ $\Omega/inch^2$ or below. In order to reduce the electrical resistivity of cleaning tapes to $1\times10^7$ $\Omega/inch^2$ or below, it is necessary to form the magnetic layer through vapor deposition or other methods in which no binder or the like is mixed in the magnetic layer.

An evaporated cleaning tape in which a magnetic layer is formed by vapor deposition is disclosed in Japanese unexamined patent publication no. 1996-315327. This cleaning tape is characteristic in that when it is applied to a high definition digital VTR system, cleaning related information can be displayed visually while cleaning.

Although it is possible to visually display cleaning related information with coated type cleaning tapes if the system has a recording density that is lower than the recording density of high definition digital VTR systems, the electromagnetic conversion performance required for such visual display in high definition digital VTR systems cannot be obtained with coated type tapes. In line with the improvement in the recording density of magnetic recording medium in recent years, the tape width is decreased to, for example, 8 mm or less.

Currently, securing sufficient electromagnetic conversion performance with such narrow tapes is only possible with evaporated tapes. Even if the magnetic layer is formed by vapor deposition, desired cleaning effects and electromagnetic conversion performance cannot be achieved unless the surface characteristics of the magnetic layer are controlled appropriately.

Accordingly, in the cleaning tape disclosed in Japanese unexamined patent publication no. 1996-315327, surface protrusions are formed on the surface of a non-magnetic substrate with a predetermined density using two types of particles having different sizes. By varying the size and the density of the particles, the surface characteristics of the magnetic layer are adjusted.

SUMMARY OF THE INVENTION

In evaporated cleaning tapes, since the magnetic layer contains no binder and the like, unlike in coated type cleaning tapes, the electrical resistivity becomes $1\times10^7$ $\Omega/inch^2$ or below. However, the cleaning tape disclosed in the above mentioned Japanese unexamined patent publication no. 1996-315327 is optimized for high definition digital VTR systems, and is not suitable for magnetoresistive heads.

Conventional evaporated cleaning tapes have an electrical resistivity of about $1 \times 10^2$ to $10^3$ $\Omega$/inch$^2$. When used on magnetoresistive heads such as GMR heads, they act as conductors for external leakage current. As a result, they are more likely to cause electrostatic discharge damage to magnetoresistive heads.

On the other hand, if the cleaning tape disclosed in Japanese unexamined patent publication no. 1996-315327 is used for cleaning magnetoresistive heads, because it is highly abrasive, it leads to excessive head wear. In the cleaning tapes disclosed in the patent application publication mentioned above, particles with a particle diameter of 95 nm±15 nm or 65 nm±15 nm are used as first particles, while particles of 25 nm±5 nm are used as second particles. Surface protrusions are formed with these particles at a density of about 20,000/mm$^2$. When particles with a particle diameter of 60 nm~100 nm are used, the amount of wear on magnetoresistive heads becomes excessive even if the particle density is lowered further, and head wear does not fall within an acceptable range unless the particle density is made zero.

The patent application publication mentioned above also describes the relationship of the RF output of the cleaning tape, reductions in the RF output of the cleaning tape after running as compared to the RF output in an ideal condition, cleaning effects and the like versus particle diameter and particle density. However, for the magnetic head in high definition digital VTR systems for which the cleaning tape described in the patent application publication mentioned above is used, since there is not as much of a need for keeping the head wear down as there is for magnetoresistive heads, no consideration is given to the amount of head wear.

As described above, in the case of a magnetoresistive head, reproduced waveforms may become non-linear depending on the amount of head wear. However, consideration need not be given to the amount of head wear in the case of a magnetic head for high definition digital VTR systems. Therefore, the effects that particle size, particle density, the thickness of the layer constituting the cleaning tape and the like have on head wear are left unexplained. With respect to cleaning tapes for magnetoresistive heads, there is a need to keep the amount of head wear low without sacrificing the cleaning effects of conventional evaporated cleaning tapes.

In consideration of the above mentioned problems, the present invention provides a cleaning tape that has an electrical resistivity within a range in which electrostatic discharge damage to magnetoresistive heads can be prevented, whose head wear is low, and which has sufficient cleaning effects.

A cleaning tape according to an embodiment of the present invention includes a non-magnetic substrate, surface protrusions formed on the non-magnetic substrate with particles having a particle diameter of 10 to 40 nm at a density of $300 \times 10^4$ per mm$^2$ to $5000 \times 10^4$ per mm$^2$, and a metal evaporated film with a thickness of 10 to 200 nm formed on the surface of the non-magnetic substrate including the surface protrusions.

Preferably, a cleaning tape according to an embodiment of the present invention further includes an inorganic protection film having a thickness of 3 to 50 nm formed on the metal evaporated film mentioned above. The inorganic protection film is preferably a carbon film formed through sputtering.

Preferably, an alloy magnetic layer containing cobalt as its primary component or a non-magnetic electrically conductive layer (specifically, an Al layer, a Cu layer or an alloy layer thereof) is used as the metal evaporated film. Alternatively, a metal layer or an alloy layer containing at least one of W, Mo, Mg, Fe and Ni may be used as the metal evaporated film.

Thus, it is possible to perform cleaning of magnetoresistive heads while preventing electrostatic discharge damage to magnetoresistive heads such as MR heads, GMR heads, and the like. Also, according to an embodiment of the cleaning head of the present invention, it is possible to suppress the wear on magnetoresistive heads due to cleaning within a tolerable range and prevent changes in the reproduced output due to changes in depth.

According to an embodiment of the cleaning tape of the present invention, sufficient cleaning effects can be realized while preventing electrostatic discharge damage to and excessive wear on magnetoresistive heads.

BRIEF DESCRIPTION OF DRAWINGS

The invention disclosed herein will become better understood as a detailed description is made of the preferred embodiments with reference to the appended drawings in which.

DETAILED DESCRIPTION OF THE PREFERRED EMBODIMENTS

Figure 1:
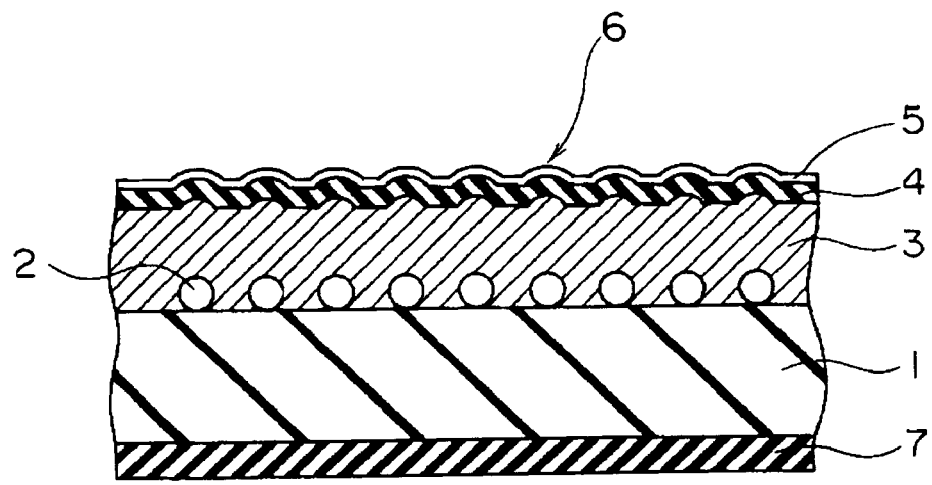
FIG. 1 shows a sectional view of one example of a cleaning tape according to an embodiment of the present invention.

Below, embodiments of the cleaning tape according to the present invention will be described with reference to the accompanying drawings. Embodiments of the cleaning tape according to the present invention are used for cleaning magnetoresistive heads such as MR heads, GMR heads, etc. FIG. 1 shows a sectional view of an embodiment of the cleaning tape according to the present invention. As shown in FIG. 1, particles 2 of a predetermined particle diameter are dispersed on a non-magnetic substrate 1 at a predetermined density.

A metal evaporated film 3 is formed on the non-magnetic substrate 1 and the particles 2. An inorganic protection film 4 is formed on the metal evaporated film 3 and a top coat layer 5 is formed on the inorganic protection film 4. On the surface of the cleaning tape are formed surface protrusions 6 which reflect the particle diameter and the density of the particles 2. Provided on the back side of the cleaning tape is a back coat layer 7.

Among the elements mentioned above, the non-magnetic substrate 1, the particles 2, the metal evaporated film 3 and the surface protrusions 6 are essential but the inorganic protection film 4 does not necessarily have to be provided. Optimum particle density and thickness of the metal evaporated film 3 vary slightly depending on whether or not the inorganic protection film 4 is used. The metal evaporated film 3 may be either a magnetic layer or a non-magnetic electrically conductive layer. Also, the top coat layer 5 and the back coat layer 7 are optional, but in order to protect the surface of the cleaning tape or improve the running performance of the cleaning tape, it is preferable that they be provided.

Next, each layer constituting the cleaning tape of the present embodiment will be described in detail below. Materials that may be used for the non-magnetic substrate 1 include polymeric materials used in the substrate of magnetic tapes, examples of which include polyethylene terephthalate (PET), polyethylene naphthalate (PEN), polyester and the like.

Particles or emulsions of, for example, $SiO_2$, $TiO_2$, $Al_2O_3$, $CaCO_3$ and the like may be used as materials for the particles 2. The emulsion may be either of an aqueous emulsion or a non-aqueous emulsion, and even latex and the like may be used.

Synthetic resins constituting the emulsions may include, but are not restricted to, for example, thermoplastic resins containing homopolymers or copolymers of, for example, vinyl acetate, ester acrylate, ester methacrylate, vinylidene chloride, vinyl chloride, ethylene, styrene and the like, thermosetting resins, such as epoxy resin and the like, synthetic rubbers, such as a butadiene-styrene copolymer, a butadiene-acrylonitrile copolymer and the like.

Materials other than those mentioned above may also be used as long as they are capable of forming the particles 2 with a predetermined height.

For purposes of simplicity, the particles 2 will be presumed spherical and their sizes will be expressed as particle diameters. The height of the protrusions is determined by the particle diameter of the particles 2.

For the metal evaporated film 3, a magnetic layer containing an alloy whose main component is Co may be used. Alternatively, an electrically conductive layer containing a non-magnetic metal, such as Al, Cu or the like or an alloy thereof, may be used as the metal evaporated film 3. It is also possible to form the metal evaporated film 3 using a metal such as W, Mo, Mg, Fe, Ni or the like or an alloy thereof. If a magnetic layer is used as the metal evaporated film 3 and magnetic recording is performed, it is possible to visually display cleaning related information while running the cleaning tape.

In addition, if the magnetic layer of the cleaning tape is formed with a material and thickness similar to those of the magnetic layer of a magnetic tape for recording whose recorded signals are reproduced by magnetoresistive heads, it is possible to bring the contact conditions between the cleaning tape and the heads closer to those between a recording tape and the heads.

On the other hand, if a non-magnetic electrically conductive layer is used as the metal evaporated film 3, it is possible to decrease the electrical resistivity as well as material costs as compared to a case in which a magnetic layer is formed with a similar thickness. The metal evaporated film 3 is formed through vacuum thin-film forming techniques. These include, vacuum deposition, sputtering, ion plating and the like.

For the inorganic protection film 4, it is possible to use any protection film, such as a carbon film and the like, generally used in magnetic recording media of a metal magnetic thin-film type. In order to form the inorganic protection film 4, it is possible to use, for example, a sputtering apparatus such as a PVD (Physical Vapor Deposition) apparatus or the like, or a CVD (Chemical Vapor Deposition) apparatus utilizing vapor phase reaction. Particularly, when a carbon film formed through sputtering is used as the inorganic protection film 4, cleaning effects can be enhanced while suppressing head wear.

Materials, besides carbon mentioned above, which may be used for the inorganic protection film 4 include $CrO_2$, $Al_2O_3$, BN, Co oxides, MgO, $SiO_2$, $Si_3O_4$, SiNx, SiC, SiNx-$SiO_2$, $ZrO_2$, $TiO_2$, TiC and the like. It is possible to use as the inorganic protection film 4 a single layer film, a multi-layer film or a composite film formed with these materials by vacuum thin-film forming means.

Generally, a transmission electron microscope (TEM) is often used as means for measuring the thickness of the metal evaporated film 3 and the inorganic protection film 4.

In the cleaning tape of the present embodiment, surface protrusions are formed on the non-magnetic substrate 1 by the particles 2, and the particle diameter and density of these particles 2 are specified. The metal evaporated film 3 is formed on the non-magnetic substrate 1 and the particles 2.

The surface characteristics of the metal evaporated film 3 formed on the non-magnetic substrate 1 reflect the configuration of the surface of the non-magnetic substrate 1. Thus, not only is good running performance of the tape secured, but also sufficient cleaning effects are obtained while suppressing head wear.

The surface protrusions may be formed on the non-magnetic substrate 1 with the particles 2 by, for example, adding the particles 2 of a predetermined particle diameter to the base material (chip) of the non-magnetic substrate 1 and dispersing them to obtain the non-magnetic substrate 1. When the base material in which the particles 2 are dispersed is shaped, surface protrusions, whose combined height of the protruding portions of the particles 2 and thickness of the resin film covering the particles 2 is equivalent to the particle diameter of the particles 2, are formed. The particle diameter of the particles 2 is assumed to be around 25 nm and between approximately 10 to 40 nm. The amount of the particles 2 to be added to the base material is adjusted so that the density of the surface protrusions protruding from the surface of the non-magnetic substrate 1 falls within the range mentioned above.

Alternatively, another way of forming the surface protrusions on the non-magnetic substrate 1 is to arrange the particles 2 of a predetermined particle diameter on the non-magnetic substrate 1 such that they will have a density within the range mentioned above, and then binding them to the non-magnetic substrate 1 using a binder resin or the like. In this case, too, the particle diameter of the particles 2 is made 10 to 40 nm, thereby making it possible to obtain the non-magnetic substrate 1 having surface protrusions of a predetermined height.

When the metal evaporated film 3 is formed on the non-magnetic substrate 1 having the above-mentioned surface protrusions, the metal evaporated film 3 reflects the configuration of the protrusions. If necessary, the inorganic protection film 4 is formed on the metal evaporated film 3. Thus a cleaning tape having protrusions of a height corresponding to the particle diameter of the particles 2 is obtained. As long as the surface configuration of the metal evaporated film 3 ultimately reflects the configuration of the surface protrusions on the non-magnetic substrate 1, the surface protrusions on the non-magnetic substrate 1 may be formed in any method.

The accuracy with which the surface of the metal evaporated film 3 reflects the configuration of the protrusions on the non-magnetic substrate 1 is dependent upon the thickness of the metal evaporated film 3. If the metal evaporated film 3 is thin, while the metal evaporated film 3 reflects the configuration of the protrusions on the non-magnetic substrate 1 relatively accurately, there is a tendency for the time required for cleaning to increase and the amount of head wear to decrease. Also, as the metal evaporated film 3 becomes thinner, its electrical resistivity becomes larger and electrostatic discharge damage to magnetoresistive heads due to static buildup becomes more likely. The thickness of the metal evaporated film 3 is set taking the factors above into consideration.

Figure 2:
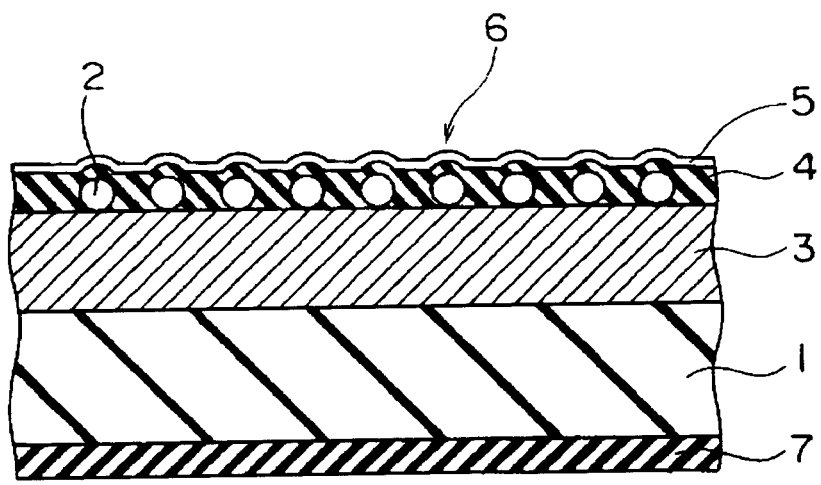
FIG. 2 shows a sectional view of another example of a cleaning tape according to an embodiment of the present invention.

On the other hand, it is possible to use a non-magnetic substrate 1 having a flat surface and to arrange the particles 2 on the surface of the metal evaporated film 3 at a predetermined density as shown in FIG. 2. In this case, the particles 2 are held in place and the surface protrusions 6 formed by covering the particles 2 with the inorganic protection film 4.

Techniques for measuring the height of the surface protrusions 6 on the cleaning tape include, for example, observing atomic images of the surface of the cleaning tape using an atomic force microscope (AFM). AFMs include a leaf spring-like cantilever section having a probe with a small tip curvature radius and a measurement system for measuring the deflection of the cantilever. When a repulsive force is at work between the atoms at the end of the probe and the atoms of the tested sample, the cantilever moves, and this deflection is detected.

In an AFM, a laser beam is irradiated on the cantilever, the position of the reflected light is sensed, and the deflection of the cantilever is measured. In order to maintain the deflection of the cantilever constant, the sample stage (piezo-translator) on which the sample to be tested is placed is moved up and down in the direction of the Z-axis (vertical direction with respect to the sample stage) and the sample stage is scanned in the directions of the X-axis and the Y-axis (two axes in the plane of the sample stage and which are mutually orthogonal). Three dimensional (3D) images are obtained based on signals for controlling the X-axis, the Y-axis and the Z-axis.

If necessary, an under coat film may be provided between the non-magnetic substrate 1 and the magnetic layer 3. This under coat film, the top coat layer 5 and the back coat layer 7 may be formed in similar fashions as under coat films, back coat layers and top coat layers in normal magnetic recording media and the method of forming them is not limited in particular.

For the top coat layer 5, perfluoropolyether (PFPE: commercially available from Montecatini Corporation under the product name of Fomblin®) may be used. Unlike the inorganic protection film 4 formed with, for example, a carbon protection film or the like, the presence of the top coat layer 5 cannot be detected with a TEM, but its fluorine peaks can be detected using a time-of-flight secondary ion mass spectrometer (TOF-SIMS) or the like.

For the back coat layer 7, a material in which a surfactant, a coupling agent or the like is added to a binder may be used. By applying and drying a substance in which these materials are dissolved or dispersed in a solvent, the top coat layer 5, the back coat layer 7 and the like are formed.

Based on the measurement results, characteristics of the cleaning tape of the present embodiment will be described below. In the following examples 1 to 9, a PET film was used as the non-magnetic substrate 1. The top coat layer 5 was provided on the front surface of the cleaning tape and the back coat layer 7 was provided on the back surface. In examples 1 to 7, a magnetic layer made of a Co alloy was formed as the metal evaporated film 3. In examples 8 and 9, a non-magnetic electrically conductive layer made of an Al alloy was formed as the metal evaporated film 3. The magnetic layer and the non-magnetic electrically conductive layer were formed through vacuum deposition.

EXAMPLE 1

Figure 3:
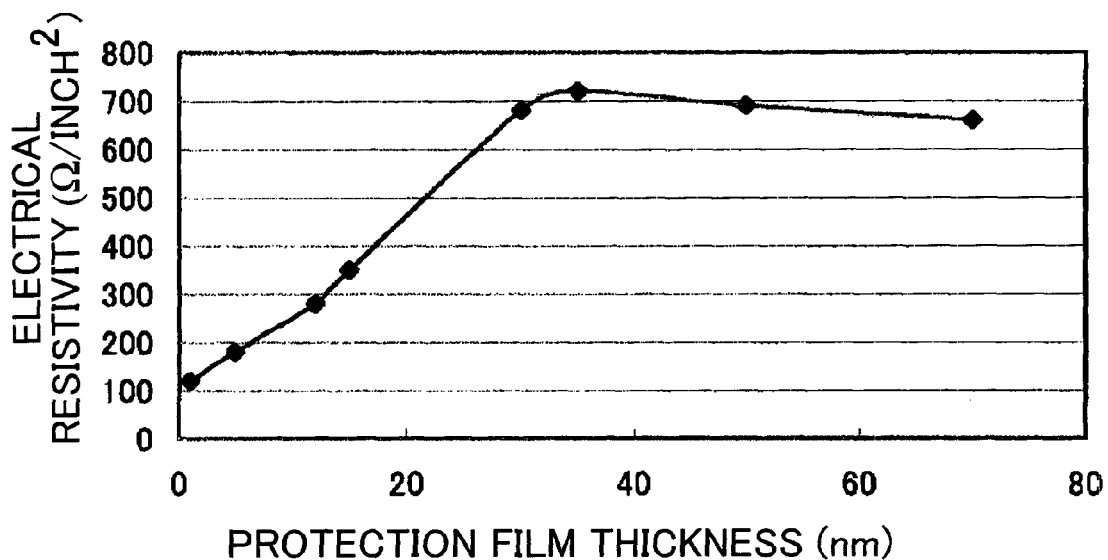
FIG. 3 is a characteristic graph related to example 1 of the present invention and shows the relationship between the thickness and the electrical resistivity of a carbon protection film.

In example 1, a cleaning tape in which the particles 2 of the cleaning tape shown in FIG. 1 is removed and which has no surface protrusions 2 was prepared and measurements of the electrical resistivity are shown. FIG. 3 shows the relationship between the thickness of a carbon protection film serving as the inorganic protection film 4 and the electrical resistivity of the surface of the cleaning tape. When the thickness of the magnetic layer is set at 150 nm and the thickness of the carbon protection film is varied, the electrical resistivity is largest when the thickness of the carbon protection film is 35 nm.

Figure 4:
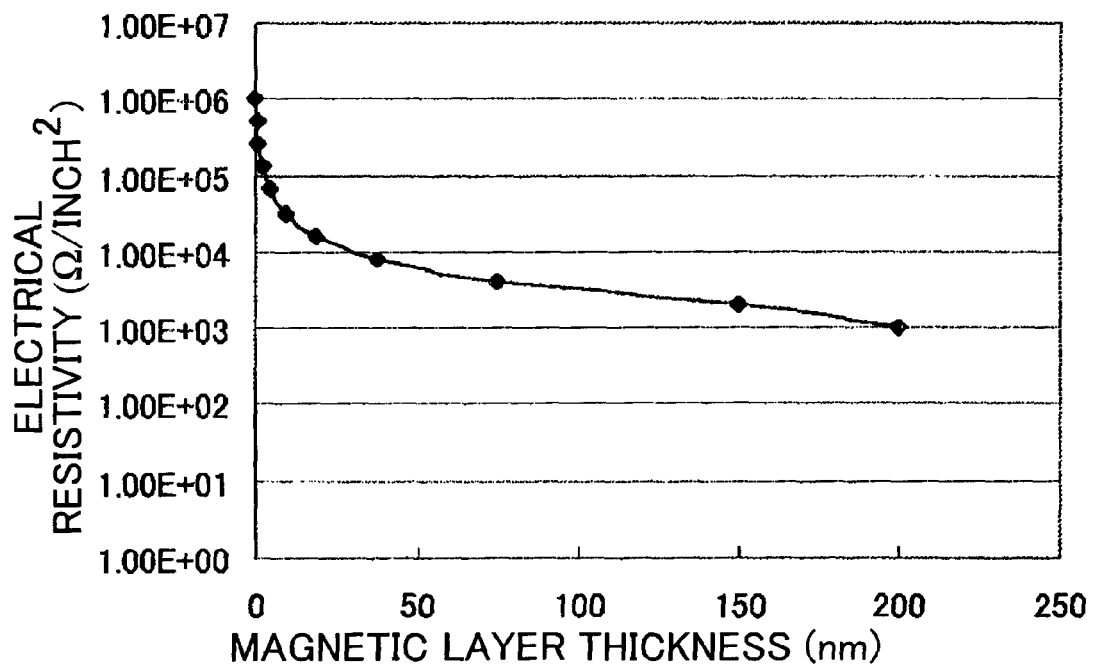
FIG. 4 is a characteristic graph related to example 1 of the present invention and shows the relationship between the thickness and the electrical resistivity of a magnetic layer.

With this particular thickness (35 nm) of the carbon protection film, measurement results of the electrical resistivity as a function of the thickness of the magnetic layer 3 are shown in FIG. 4. As shown in FIG. 4, electrical resistivity decreases as the magnetic layer 3 becomes thicker. Once the magnetic layer 3 becomes thinner than about 30 nm, electrical resistivity increases drastically. When the thickness of the magnetic layer 3 is 1 nm, electrical resistivity is $1\times10^6$ $\Omega/inch^2$. With the PET film alone (i.e., the thickness of the magnetic layer 3 is zero), electrical resistivity becomes $1\times10^{11}$ $\Omega/inch^2$ or higher. On the other hand, when the thickness of the magnetic layer 3 is 200 nm, electrical resistivity is $1\times10^3$ $\Omega/inch^2$.

Therefore, in order to prevent electrostatic discharge damage to magnetoresistive heads due to static buildup in the cleaning tape, the thickness of the magnetic layer 3 needs to be approximately 1 nm or above even if the carbon protection layer has a thickness at which electrical resistivity is highest (35 nm). Also, in order to protect magnetoresistive heads from electrostatic discharge damage due to external leakage current, it can be seen that the upper limit of the thickness of the magnetic layer 3 is 200 nm.

However, in order to reliably protect heads from electrostatic discharge damage due to external leakage current, it is preferable to provide some margin in electrical resistivity by making the magnetic layer 3 thinner than 200 nm. As such, in practice, it is preferable that the thickness of the magnetic layer 3 of the cleaning tape for MR heads be about 50 nm at which electrical resistivity can be made higher than $1\times10^3$ $\Omega/inch^2$. Also, it is preferable that the thickness of the magnetic layer 3 of the cleaning tape for GMR heads be approximately 10 to 20 nm at which electrical resistivity can be made higher still.

EXAMPLE 2

In examples 2 to 4 below, as shown in FIG. 1, a carbon protection film was formed as the inorganic protection film 4 over the magnetic layer serving as the metal evaporated film 3. The carbon protection film was formed through sputtering. In example 2, the particle diameter of the particles 2 was 25 nm±5 nm, in example 3, the particle diameter of the particles 2 was made smaller (15 nm±5 nm), and in example 4, the particle diameter of the particles 2 was made larger (35 nm±5 nm).

Figure 5:
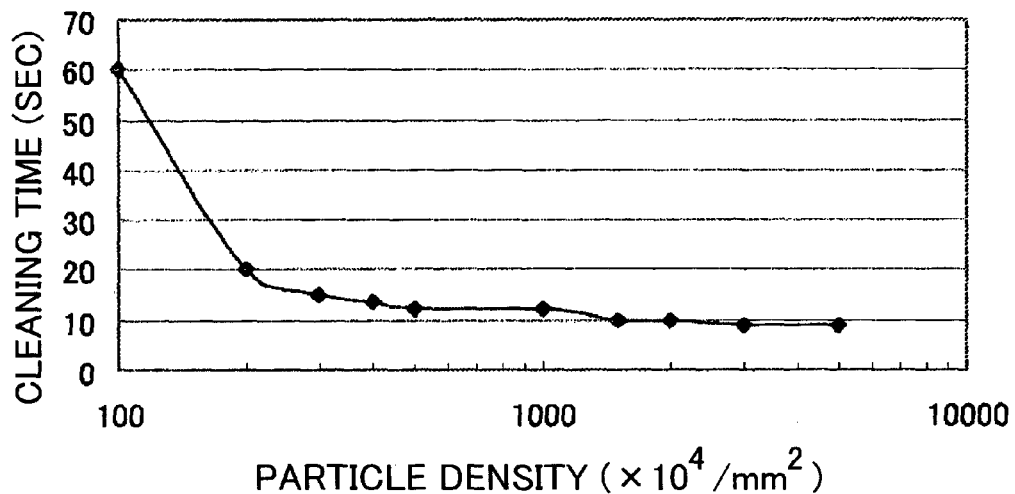
FIG. 5 is a characteristic graph related to example 2 of the present invention and shows the relationship between particle density and cleaning time when particles with a particle diameter of 25 nm±5 nm are used.

Measurement results obtained with the cleaning tape of example 2 will be described below with reference to FIG. 5 to FIG. 9. FIG. 5 shows the results of analyzing the density of the surface protrusions (i.e., particle density) at which sufficient cleaning effects can be obtained when the thickness of the magnetic layer 3 is 50 nm and the thickness of the carbon protection film is 10 nm. The particles 2 of a particle diameter of 25 nm±5 nm were arranged on the non-magnetic substrate 1 to form protrusions on the surface of the magnetic layer 3.

Cleaning effects were determined by passing a cleaning tape around heads, on the surfaces of which magnetic particles or the like were intentionally deposited to place them in a state in which an RF reproduction output could not be obtained, and then measuring the time required for the RF reproduction output to recover (which may be referred to as cleaning time).

Specifically, a magnetic tape in which no layer containing a lubricant nor an inorganic protection film is formed and in which magnetic particles, metal oxides and the like are easily deposited (i.e., in which particles are easily collected on the heads) was prepared. While passing this magnetic tape over the heads, the magnetic tape was paused for about 5 minutes, thereby depositing magnetic particles of the magnetic layer onto the heads. As a result, the heads were placed in a state in which no RF reproduction output could be obtained.

Then, the cleaning tape is run, and the time taken for the RF reproduction output reproduced by the heads to recover to ±0.5 dB of the initial condition before magnetic particles were deposited on the magnetic heads was measured. With general users in mind, a reference for an ideal cleaning time was taken to be 5 seconds. If the cleaning time is long (for example, 20 seconds or longer), users cannot comfortably use the cleaning tape.

On the other hand, if the cleaning time is too short (for example, 2 or 3 seconds), the cleaning tape would have to be stopped immediately after being run, and users, again, would not be able to use the cleaning tape comfortably. Since it is difficult to precisely control the cleaning time, there is a possibility that excessive cleaning is performed, thereby causing head wear to exceed a tolerable range. Taking the factors above into consideration, the reference cleaning time was determined to be about 5 seconds, and not more than approximately 10 seconds.

However, the cleaning time need not be restricted as strictly as head wear or the electrical resistivity of the tape. If head wear or the electrical resistivity of the tape is outside a tolerable range, there is a possibility that irreversible damage might be caused to the magnetoresistive heads. However, the cleaning time is set primarily based on, as mentioned above, how comfortably the cleaning tape can be used. Ordinarily, no damage would be caused to the magnetoresistive heads unless the cleaning time is set to be extremely short, or the cleaning tape is used over an excessively long period in relation to the reference cleaning time.

In addition, it is possible to run the cleaning tape a plurality of times. For example, if dirt has been deposited heavily on the magnetoresistive heads, the cleaning tape may be run for 5 seconds first, and the cleaning tape may then be run for another 5 seconds to remove dirt that could not be removed the first time. If the cleaning tape is used in such a manner, cleaning effects may be enhanced without extending the normal cleaning time.

Thus, it is possible to prevent the time over which the cleaning tape is used form becoming unnecessarily long, thereby preventing head wear from increasing. Also, it is possible to prevent dirt from being left behind due to insufficient cleaning. It is also possible to incorporate into the magnetic tape player system a mechanism for monitoring the cleaning condition of the magnetoresistive heads, for example, based on the reproduced RF output such that whether or not the cleaning tape needs to be run longer can be determined automatically.

As described above, although the reference cleaning time may slightly affect head wear, unlike electrical resistivity it does not directly affect electrostatic discharge damage to the heads. Also, since cleaning may be performed a plurality of times as needed, the optimum cleaning time mentioned above (about 5 seconds but no longer than 10 seconds) should be understood merely as a reference.

As shown in FIG. 5, when the particle diameter is 25 nm±5 nm and the particle density is $500\times10^4$ per mm$^2$, the cleaning time is about 12 seconds. When the particle density is between $500\times10^4$ and $5000\times10^4$ per mm$^2$, the cleaning time is about 10 seconds, which is suitable for use as a cleaning tape.

Figure 6:
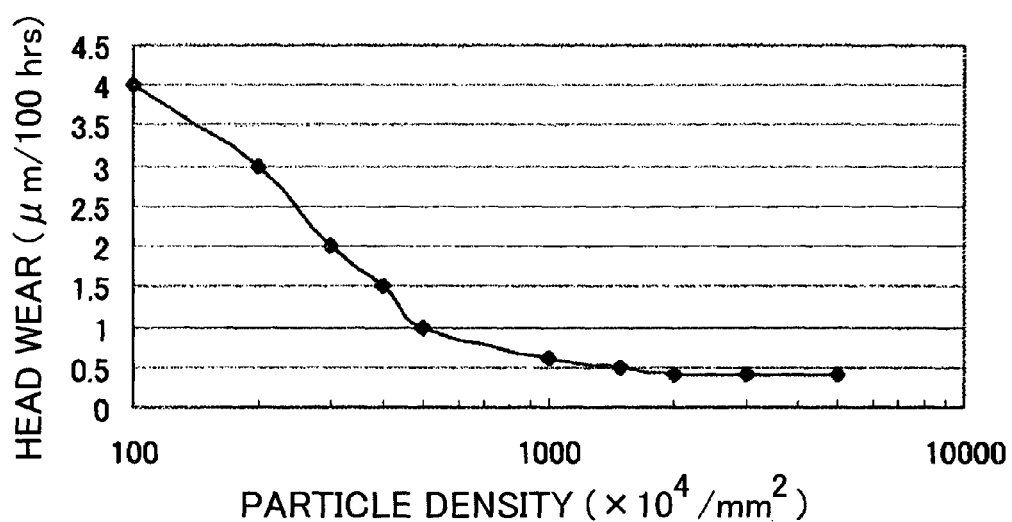
FIG. 6 is a characteristic graph related to example 2 of the present invention and shows the relationship between particle density and head wear when particles with a particle diameter of 25 nm±5 nm are used.

FIG. 6 shows the results of analyzing the relationship between the density of the surface protrusions and head wear when the thickness of the magnetic layer 3 is 50 nm and the thickness of the carbon protection film is 10 nm as in FIG. 5. As can be seen from FIG. 6, the denser the surface protrusions are, the less the amount of head wear can be made. The tolerable range for the amount of head wear on MR heads or GMR heads in relation to the period of time a cleaning tape is run is generally said to be up to about 1 $\mu$m/100 hours. When this is taken as a reference, the particle density at which head wear can be kept within the tolerable range would be about $500\times10^4$ to $5000\times10^4$ per mm$^2$. Although FIG. 6 relates to MR heads, similar results are obtained with GMR heads.

From FIG. 5 and FIG. 6, it can be understood that in order to achieve both sufficient cleaning effects as well as low abrasiveness (wear), the density of the surface protrusions should be in the range of about $500\times10^4$ per mm$^2$ to $5000\times10^4$ per mm$^2$. When the particle density deviates from the range above, a good balance between cleaning effects and low abrasiveness becomes impossible to maintain.

Figure 7:
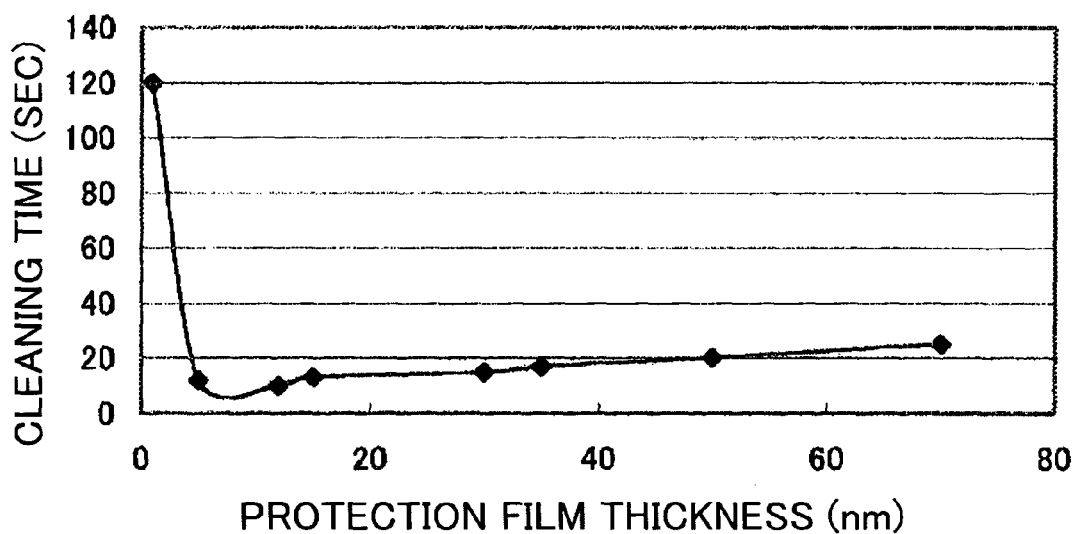
FIG. 7 is a characteristic graph related to example 2 of the present invention and shows the relationship between the thickness of the carbon protection film and cleaning time when particles with a particle diameter of 25 nm±5 nm are used.

FIG. 7 shows the results of analyzing the relationship between the thickness of the carbon protection film and cleaning time when the thickness of the magnetic layer 3 is 50 nm and the density of the surface protrusions is $500\times10^4$ per mm$^2$. As shown in FIG. 7, the reference cleaning time (5 to 10 seconds) is achieved when the thickness of the carbon protection film is in the range of about 3 nm to 15 nm. When the carbon protection film is made thicker, the cleaning time becomes slightly longer and cleaning effects are compromised.

Figure 8:
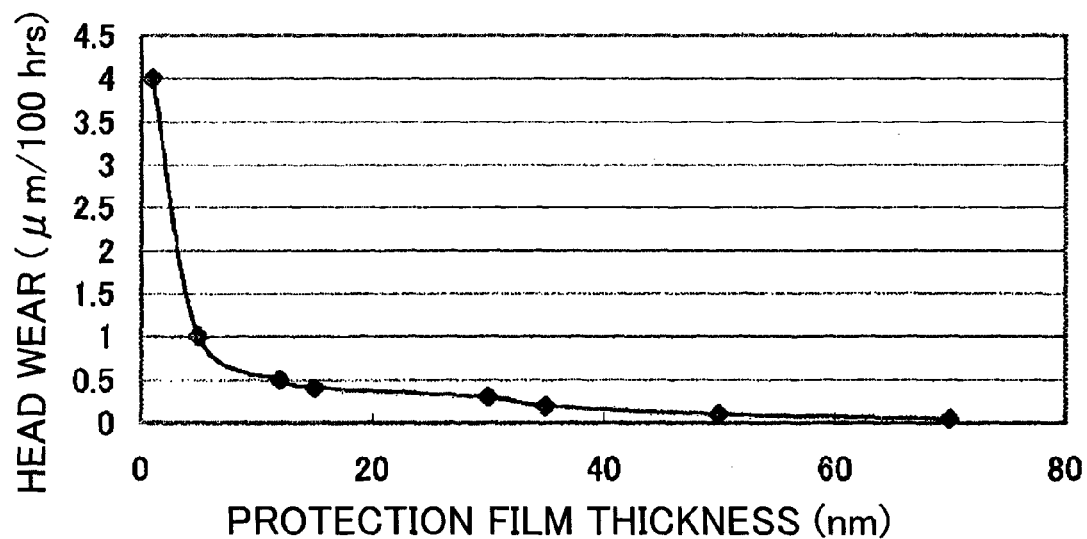
FIG. 8 is a characteristic graph related to example 2 of the present invention and shows the relationship between the thickness of the carbon protection film and head wear when particles with a particle diameter of 25 nm±5 nm are used.

On the other hand, FIG. 8 shows the results of analyzing the relationship between the thickness of the carbon protection film and head wear when, as in FIG. 7, the thickness of the magnetic layer 3 is 50 nm and the density of the surface protrusions is $500\times10^4$ per mm$^2$. As shown in FIG. 8, when the thickness of the carbon protection film is 3 nm, head wear is 1 $\mu$m/100 hours. As the carbon protection film becomes thicker, head wear becomes smaller. It can be seen that the carbon protection film should be 3 nm or thicker in order to keep head wear in relation to the period of time over which the cleaning tape is run within the above mentioned tolerable range (1 $\mu$m/100 hours).

From FIG. 7 and FIG. 8, it can be seen that the thickness of the carbon protection film should be in the range of about 3 nm to 30 nm in order to achieve both sufficient cleaning effects and low abrasiveness (wear). However, if there is a need to suppress head wear, the carbon protection film may be made thicker (for example, up to about 50 nm) and the cleaning time longer. Although head wear decreases as the carbon protection film becomes thicker, cleaning effects are slightly compromised. Therefore, the thickness of the carbon protection film should be set taking the balance between cleaning effects and low abrasiveness into consideration.

Figure 9:
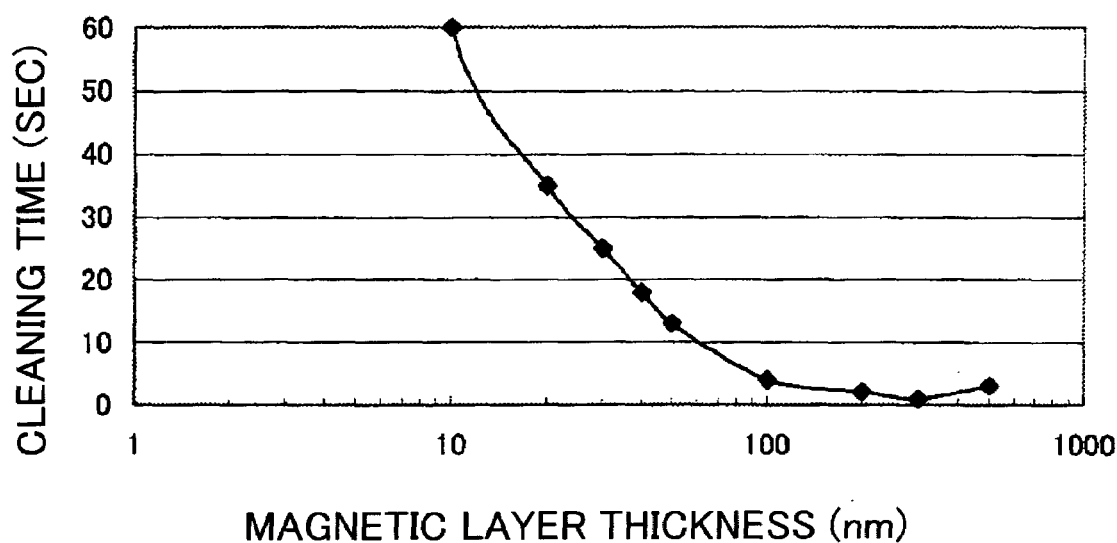
FIG. 9 is a characteristic graph related to example 2 of the present invention and shows the relationship between the thickness of the magnetic layer and cleaning time when particles with a particle diameter of 25 nm±5 nm are used.

FIG. 9 shows the results of analyzing the relationship between the thickness of the magnetic layer and cleaning time when the thickness of the magnetic layer 3 is 50 nm and the density of the surface protrusions is $500\times10^4$ per mm$^2$. As shown in FIG. 9, the reference cleaning time (of about 10 seconds) is obtained when the thickness of the magnetic layer is about 50 nm or above. As the magnetic layer becomes thicker, cleaning effects are further enhanced.

However, as shown in FIG. 4, as the magnetic layer becomes thicker, the electrical resistivity of the cleaning tape decreases and magnetoresistive heads become more susceptible to electrostatic discharge damage due to external leakage current. On the contrary, when the thickness of the magnetic layer is about 10 nm, it is possible to increase the electrical resistivity of the cleaning tape within a range in which electrostatic discharge damage to the heads due to static buildup in the cleaning tape itself can be prevented.

As shown in FIG. 9, the cleaning time when the thickness of the magnetic layer is 10 nm and 20 nm is 60 seconds and 35 seconds, respectively. These values are not impractical provided that cleaning is carried out over a plurality of times. Accordingly, in a case where it is desired that the electrical resistivity be increased to, for example, about $1\times10^6$ Ω/inch$^2$, or ideally to about $1\times10^7$ Ω/inch$^2$ as with a cleaning tape for GMR heads, one can be used as a cleaning tape even if the magnetic layer is as thin as about 10 nm. Although not shown, as the magnetic layer becomes thinner, head wear tends to decrease. If electrical resistivity is prioritized, the thickness of the magnetic layer may be made to be about 10 to 20 nm.

As described above, it is possible to prevent electrostatic discharge damage to and excessive wear on magnetoresistive heads by forming the magnetic layer and the carbon protection film with thicknesses of 10 to 200 nm and 3 to 50 nm, respectively, in a cleaning tape in which a magnetic layer is formed as the metal evaporated film. Also, sufficient cleaning effects can be obtained while suppressing head wear within a tolerable range by forming surface protrusions on the cleaning tape with particles of a particle diameter of 25 nm±5 nm at a density of $500\times10^4$ to $5000\times10^4$ per mm$^2$.

EXAMPLE 3

Cleaning tapes were prepared in a manner similar to example 2 above except in that the particle diameter of the particles 2 was changed to 15 nm±5 nm and various measurements were taken. The tolerable range of head wear, the method of evaluating cleaning effects, and the like were the same as example 2 above. FIG. 10 to FIG. 14 show measurement results when particles of a particle diameter of 15 nm±5 nm were used.

Figure 10:
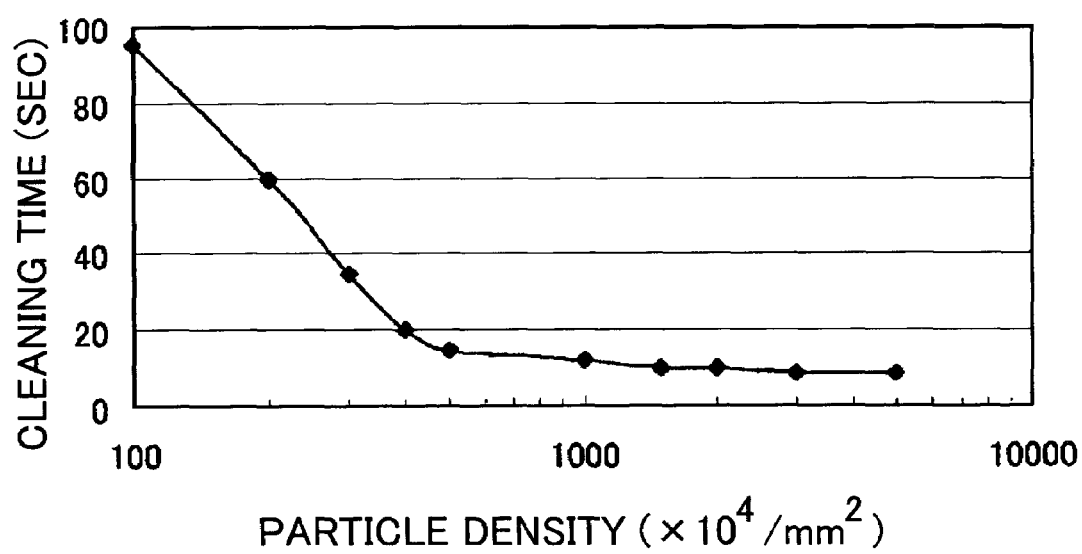
FIG. 10 is a characteristic graph related to example 3 of the present invention and shows the relationship between particle density and cleaning time when particles with a particle diameter of 15 nm±5 nm are used.

FIG. 10 shows the results of analyzing the density of the surface protrusions that provide for sufficient cleaning effects when the thickness of the magnetic layer 3 is 50 nm and the thickness of the carbon protection film is 10 nm. According to the reference cleaning time mentioned above (about 10 seconds or shorter), sufficient cleaning effects were achieved when the density of the particles was $1000\times10^4$ per mm$^2$ or higher. Also, as long as the density of the particles was $500\times10^4$ per mm$^2$ or higher, the cleaning time was less than 20 seconds, and generally substantial cleaning effects were obtained.

Figure 11:
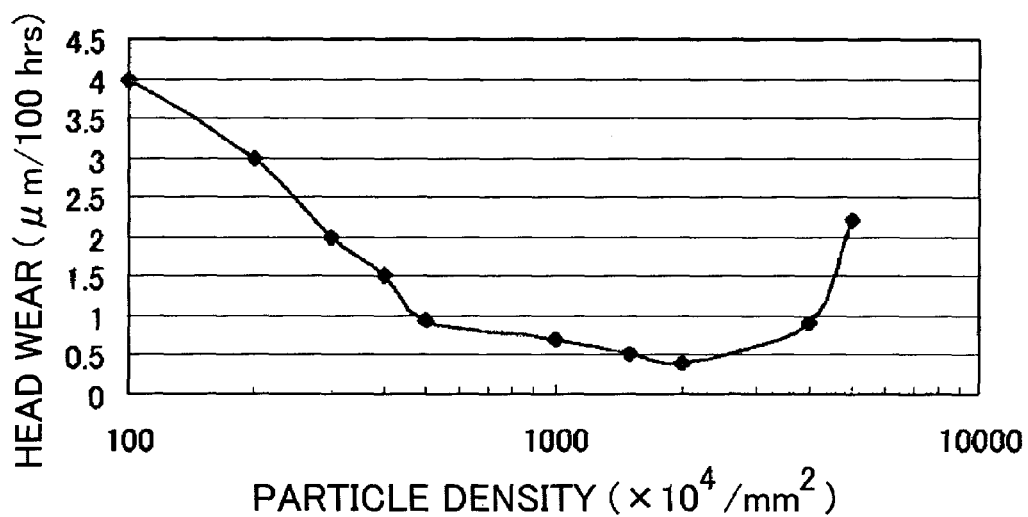
FIG. 11 is a characteristic graph related to example 3 of the present invention and shows the relationship between particle density and head wear when particles with a particle diameter of 15 nm±5 nm are used.

FIG. 11 shows the results of analyzing the relationship between the density of the surface protrusions and head wear when the thickness of the magnetic layer 3 is 50 nm and the thickness of the carbon protection film is 10 nm as in FIG. 10. As shown in FIG. 11, by making the density of particles be $500\times10^4$ to $4000\times10^4$ per mm$^2$, head wear in relation to the period of time over which the cleaning tape is used can be kept within the above mentioned tolerable range (1 μm/100 hours).

From FIG. 10 and FIG. 11, it can be seen that by making the density of the surface protrusions be about $1000\times10^4$ per mm$^2$ to $4000\times10^4$ per mm$^2$, both sufficient cleaning effects as well as low abrasiveness can be achieved simultaneously. If low abrasion is prioritized, the lower limit for the density of the surface protrusions may be made $500\times10^4$ per mm$^2$. If the density of the particles deviates from the range above, a good balance between cleaning effects and low abrasiveness cannot be maintained.

Figure 12:
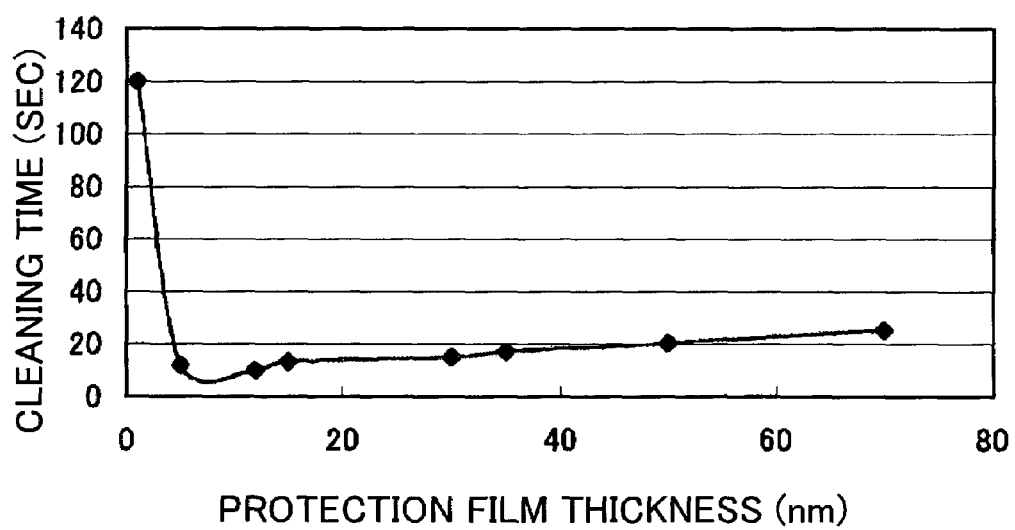
FIG. 12 is a characteristic graph related to example 3 of the present invention and shows the relationship between the thickness of a carbon protection film and cleaning time when particles with a particle diameter of 15 nm±5 nm are used.

FIG. 12 shows the results of analyzing the relationship between the thickness of the carbon protection film and cleaning effects when the thickness of the magnetic layer 3 is 50 nm and the density of the surface protrusions is $500\times10^4$ per mm$^2$. As is apparent from FIG. 12, the reference cleaning time (5 to 10 seconds) can be achieved when the thickness of the carbon protection film is in the range of about 3 nm to 15 nm. As the carbon protection film becomes thicker, the cleaning time increases slightly and the cleaning effects are slightly compromised.

Figure 13:
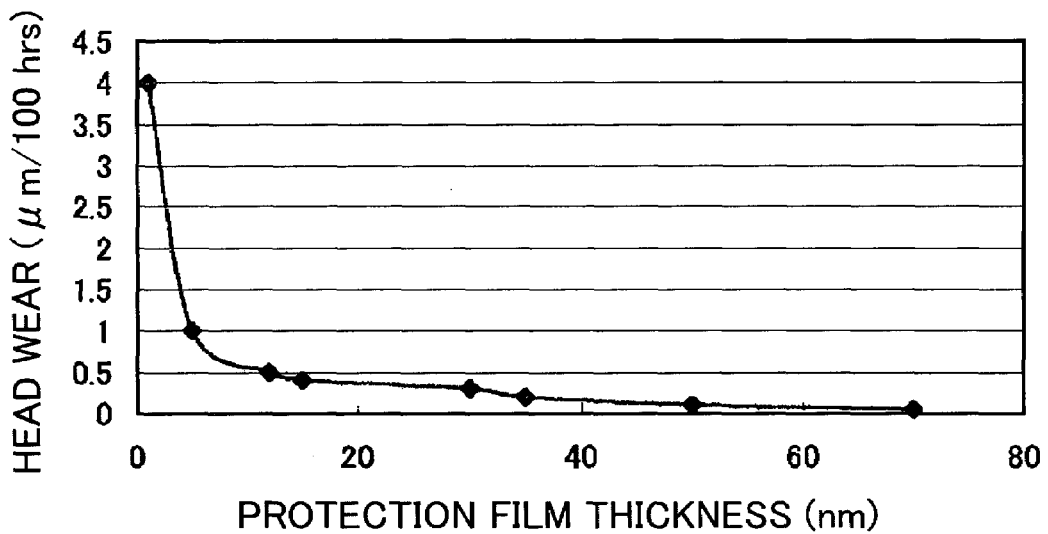
FIG. 13 is a characteristic graph related to example 3 of the present invention and shows the relationship between the thickness of a carbon protection film and head wear when particles with a particle diameter of 15 nm±5 nm are used.

FIG. 13 shows the results of analyzing the relationship between the thickness of the carbon protection film and head wear when, as in FIG. 12, the thickness of the magnetic layer 3 is 50 nm and the density of the surface protrusions is $500\times10^4$ per mm$^2$. As shown in FIG. 13, head wear is 1 μm/100 hours when the thickness of the carbon protection film is 3 nm. As the carbon protection film becomes thicker, head wear decreases. It can be seen that by making the thickness of the carbon protection film be 3 nm or above, head wear in relation to the period of time over which the cleaning tape is used can be kept within the tolerable range (1 μm/100 hours) mentioned above.

From FIG. 12 and FIG. 13, it can be seen that by making the thickness of the carbon protection film be about 3 nm to 30 nm, both sufficient cleaning effects as well as low abrasiveness can be achieved simultaneously. However, if head wear, in particular, needs to be kept low, the carbon protection film may be made thicker (for example, about 50 nm) and the cleaning time longer. Although head wear decreases as the carbon protection film becomes thicker, cleaning effects are slightly compromised. Accordingly, the thickness of the carbon protection film should be set taking the balance between cleaning effects and low abrasiveness into consideration.

Figure 14:
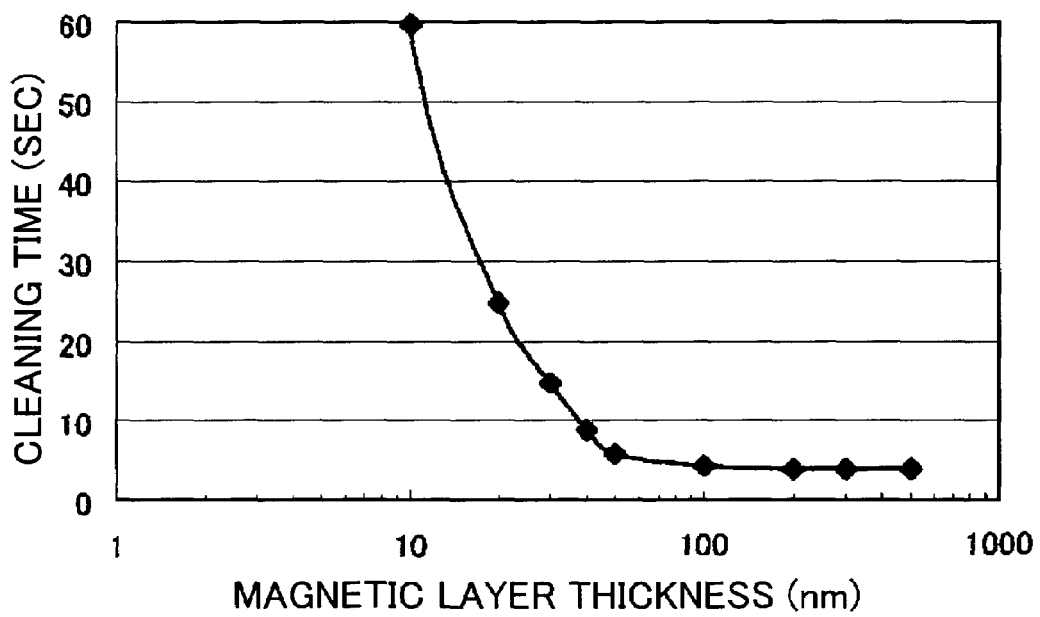
FIG. 14 is a characteristic graph related to example 3 of the present invention and shows the relationship between the thickness of a magnetic layer and cleaning time when particles with a particle diameter of 15 nm±5 nm are used.

FIG. 14 shows the results of analyzing the relationship between the thickness of the magnetic layer and cleaning time when the thickness of the magnetic layer 3 is 50 nm, the density of the surface protrusions is $1500\times10^4$ per mm$^2$ and the thickness of the carbon protection film is 10 nm. As shown in FIG. 14, the reference cleaning time (about 10 seconds or shorter) is achieved when the thickness of the magnetic layer is about 40 nm or above. As the magnetic layer becomes thicker, cleaning effects are further enhanced.

However, as shown in FIG. 4, the electrical resistivity of the cleaning tape decreases as the magnetic layer becomes thicker and magnetoresistive heads become more susceptible to electrostatic discharge damage due to external leakage current. On the contrary, when the thickness of the magnetic layer is made to be about 10 nm, the electrical resistivity of the cleaning tape can be increased within a range in which electrostatic discharge damage to the heads due to static buildup in the cleaning tape itself can be prevented.

As shown in FIG. 14, the cleaning time when the thickness of the magnetic layer is 10 nm and 20 nm are 60 seconds and 25 seconds, respectively, and these values are not impractical provided that cleaning is carried out over a plurality of times. Accordingly, in a case where it is desired that electrical resistivity be increased to about $1\times10^6$ Ω/inch$^2$, or ideally to about $1\times10^7$ Ω/inch$^2$, as with, for example, a cleaning tape for GMR heads, one can be used as a cleaning tape even if the magnetic layer is made to be as thin as about 10 nm. Although not shown, head wear tends to decrease as the magnetic layer becomes thinner. If electrical resistivity is prioritized, the thickness of the magnetic layer can be made to be about 10 to 20 nm.

As mentioned above, electrostatic discharge damage to and excessive wear on the magnetoresistive heads can be prevented by forming the magnetic layer with a thickness of 10 to 200 nm and the carbon protection film with a thickness of about 3 to 50 nm in a cleaning tape in which the magnetic layer is formed as the metal evaporated film. Also, by forming the surface protrusions on the cleaning tape with particles of a particle diameter of 15 nm±5 nm and at a density of 500×10$^4$ to 4000×10$^4$ per mm$^2$, sufficient cleaning effects can be obtained while suppressing head wear within a tolerable range.

EXAMPLE 4

In this example, cleaning tapes were prepared in a similar manner as example 2 described above except in that the particle diameter of the particles 2 was changed to 35 nm±5 nm, and various measurements were taken. The tolerable range of head wear, the method of evaluating cleaning effects, and the like are the same as those of example 2. FIG. 15 to FIG. 19 show measurement results in cases where particles with a particle diameter of 35 nm±5 nm were used.

Figure 15:
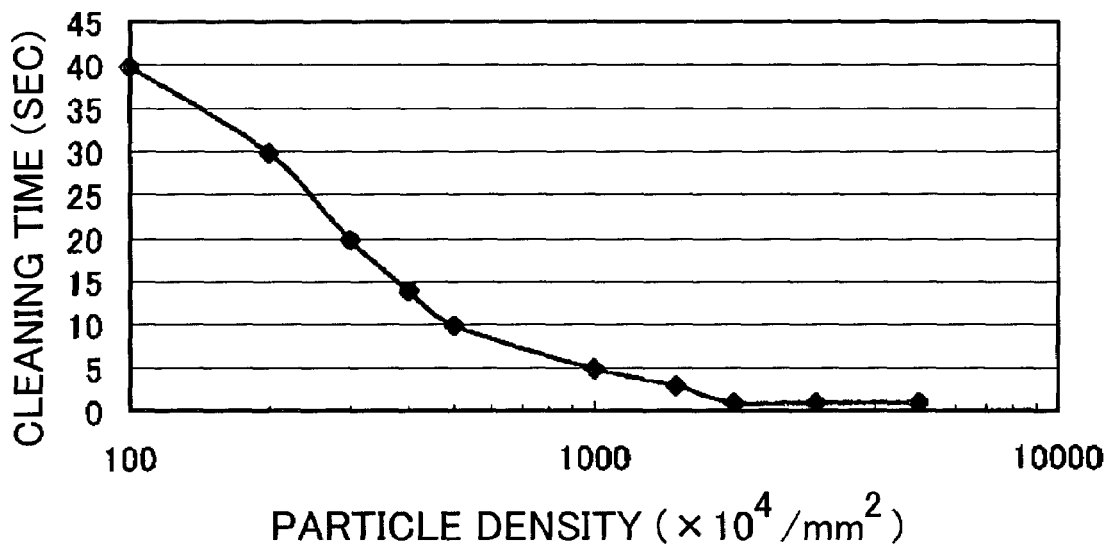
FIG. 15 is a characteristic graph related to example 4 of the present invention and shows the relationship between particle density and head wear when particles with a particle diameter of 35 nm±5 nm are used.

FIG. 15 shows the results of analyzing the density of surface protrusions at which sufficient cleaning effects can be obtained when the thickness of the magnetic layer 3 is 50 nm and the thickness of the carbon protection film is 10 nm. According to the above mentioned ideal cleaning time (about 10 seconds or shorter), sufficient cleaning effects are obtained when the particle density is 500×10$^4$ per mm$^2$ or higher. Also, so long as the particle density is 300×10$^4$ per mm$^2$ or higher, cleaning time is 20 seconds or shorter and generally sufficient cleaning effects are obtained.

Figure 16:
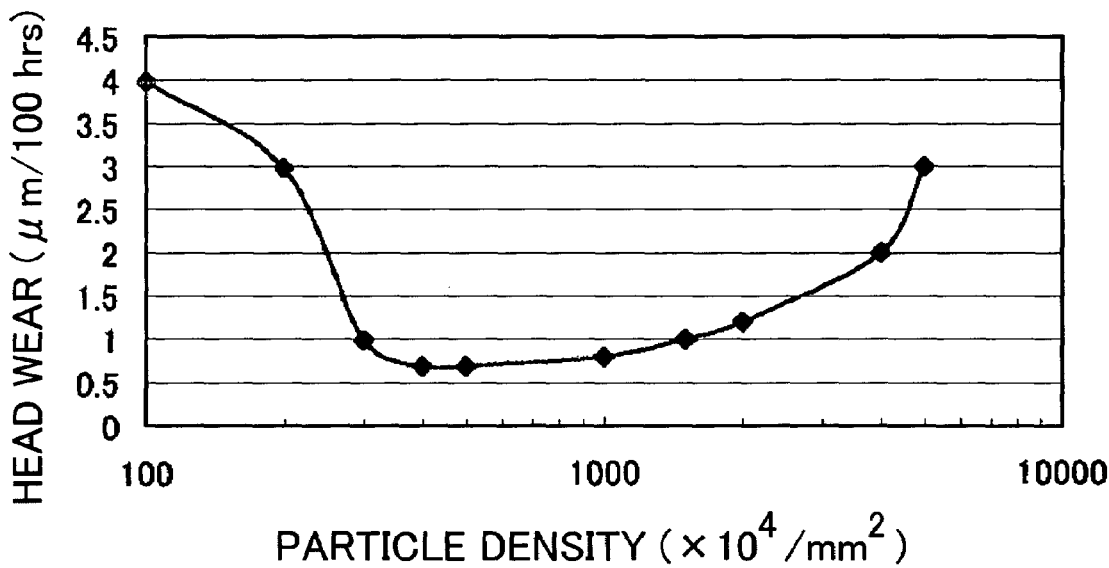
FIG. 16 is a characteristic graph related to example 4 of the present invention and shows the relationship between particle density and head wear when particles with a particle diameter of 35 nm±5 nm are used.

FIG. 16 shows the results of analyzing the relationship between the density of the surface protrusions and head wear when, as in FIG. 15, the thickness of the magnetic layer 3 is 50 nm and the thickness of the carbon protection film is 10 nm. As shown in FIG. 16, by making the particle density be 300×10$^4$ to 1500×10$^4$ per mm$^2$, head wear in relation to the period of time over which the cleaning tape is used can be kept within the above mentioned tolerable range (1 μm/100 hours).

From FIG. 15 and FIG. 16, it can be seen that by making the density of the surface protrusions be in the range of about 500×10$^4$ per mm$^2$ to 1500×10$^4$ per mm$^2$, both sufficient cleaning effects and low abrasiveness can be achieved simultaneously. If low abrasiveness is prioritized, the lower limit of the density of the surface protrusions may be made 300×10$^4$ per mm$^2$. If the particle density deviates from the range above, a good balance between cleaning effects and low abrasiveness cannot be maintained.

Figure 17:
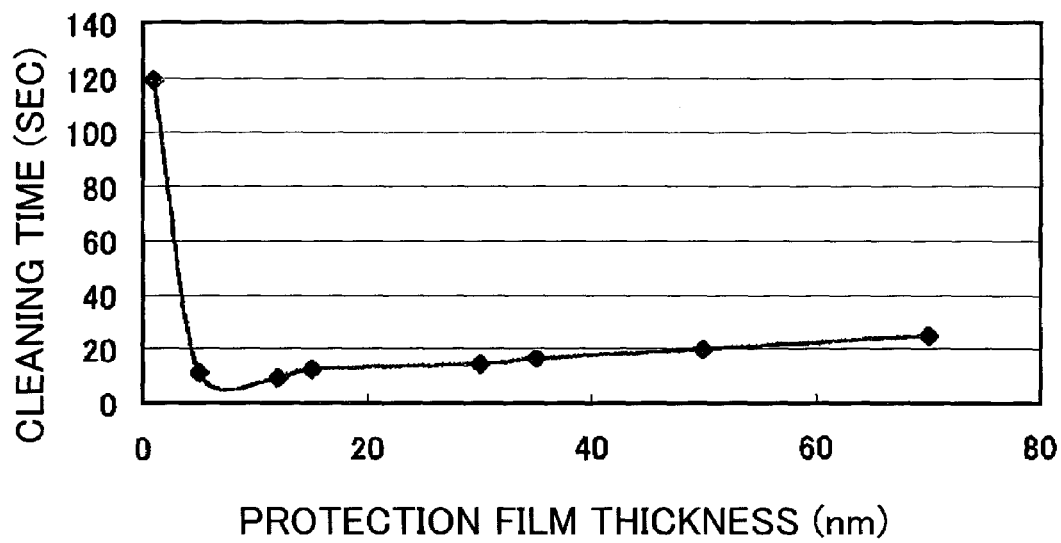
FIG. 17 is a characteristic graph related to example 4 of the present invention and shows the relationship between the thickness of a carbon protection film and cleaning time when particles with a particle diameter of 35 nm±5 nm are used.

FIG. 17 shows the results of analyzing the relationship between the thickness of the carbon protection film and cleaning effects when the thickness of the magnetic layer 3 is 50 nm and the density of the surface protrusions is 500×10$^4$ per mm$^2$. As shown in FIG. 17, the reference cleaning time (5 to 10 seconds) can be obtained when the thickness of the carbon protection film is in the range of about 3 nm to 15 nm. As the carbon protection film becomes thicker, cleaning time increases slightly and cleaning effects are slightly compromised.

Figure 18:
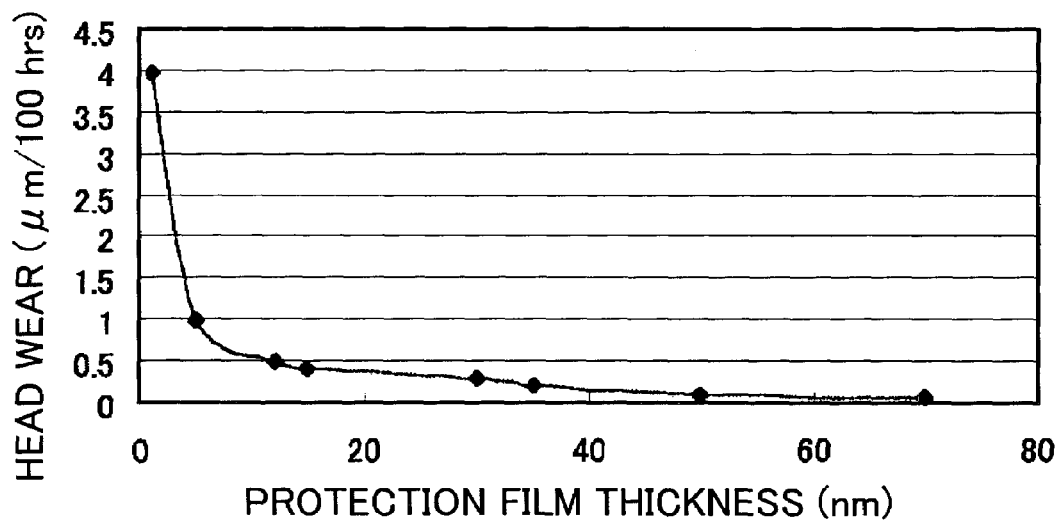
FIG. 18 is a characteristic graph related to example 4 of the present invention and shows the relationship between the thickness of a carbon protection film and head wear when particles with a particle diameter of 35 nm±5 nm are used.

FIG. 18 shows the results of analyzing the relationship between the thickness of the carbon protection film and head wear when, as in FIG. 17, the thickness of the magnetic layer 3 is 50 nm and the density of the surface protrusions is 500×10$^4$ per mm$^2$. As shown in FIG. 18, head wear is 1 μm/100 hours when the thickness of the carbon protection film is 3 nm. As the carbon protection film becomes thicker, head wear decreases. It can be seen that by making the thickness of the carbon protection film be 3 nm or greater, head wear in relation to the period of time over which the cleaning tape is used can be kept within the above mentioned tolerable range (1 μm/100 hours).

From FIG. 17 and FIG. 18, it can be seen that the by making the thickness of the carbon protection film be in the range of about 3 nm to 30 nm, both sufficient cleaning effects and low abrasiveness can be achieved simultaneously. However, if head wear, in particular, needs to be kept low, the carbon protection film may be made thicker (for example, about 50 nm) and the cleaning time longer. Although head wear decreases as the carbon protection film becomes thicker, cleaning effects are slightly compromised. Accordingly, the thickness of the carbon protection film should be set taking the balance between cleaning effects and low abrasiveness into consideration.

Figure 19:
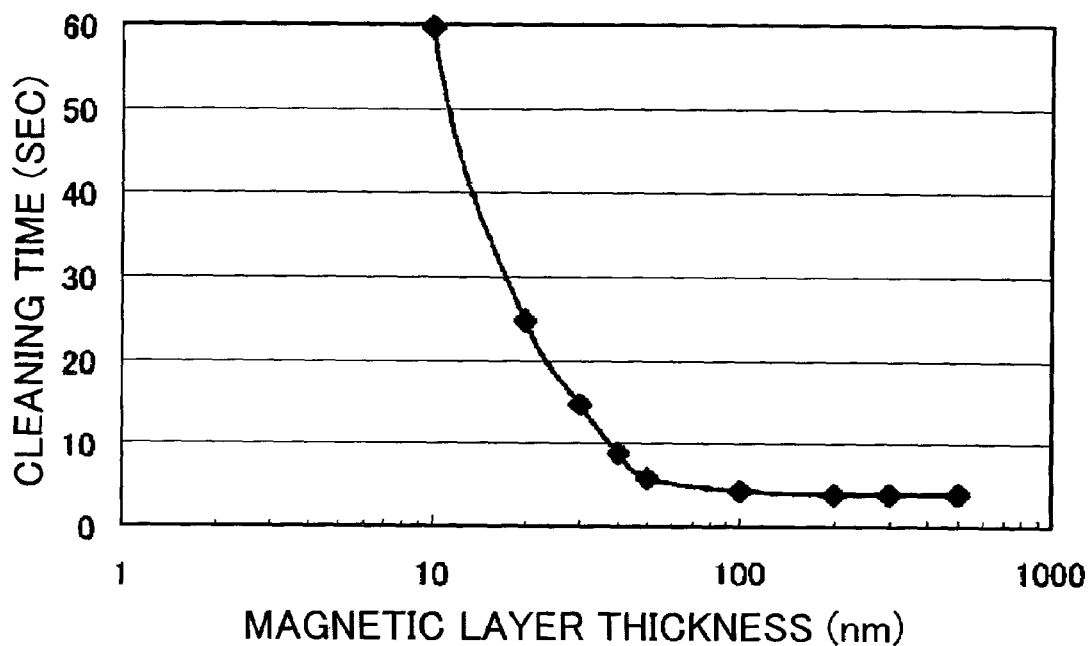
FIG. 19 is a characteristic graph related to example 4 of the present invention and shows the relationship between the thickness of a magnetic layer and cleaning time when particles with a particle diameter of 35 nm±5 nm are used.

FIG. 19 shows the results of analyzing the relationship between the thickness of the magnetic layer and cleaning time when the thickness of the magnetic layer 3 is 50 nm, the density of the surface protrusions is 500×10$^4$ per mm$^2$ and the thickness of the carbon protection film is 10 nm. As shown in FIG. 19, the reference cleaning time (about 10 seconds or shorter) is achieved when the thickness of the magnetic layer is about 40 nm or greater. As the magnetic layer becomes thicker, cleaning effects are further enhanced.

However, as shown in FIG. 4, the electrical resistivity of the cleaning tape decreases as the magnetic layer becomes thicker, and magnetoresistive heads become more susceptible to electrostatic discharge damage due to external leakage current. On the contrary, if the magnetic layer is made to be as thin as about 10 nm, the electrical resistivity of the cleaning tape can be increased within a range in which electrostatic discharge damage to heads due to static buildup in the cleaning tape itself can be prevented.

As shown in FIG. 19, the cleaning time when the thickness of the magnetic layer is 10 nm and 20 nm is 60 seconds and 25 seconds, respectively. These values are not impractical provided that cleaning is carried out over a plurality of times. Accordingly, in a case where it is desired that the electrical resistivity be increased to, for example, about 1×10$^6$ Ω/inch$^2$, or ideally to about 1×10$^7$ Ω/inch$^2$ as with a cleaning tape for GMR heads, one can be used as a cleaning tape even if the magnetic layer is as thin as about 10 nm. Although not shown, as the magnetic layer becomes thinner, head wear tends to decrease. If electrical resistivity is prioritized, the thickness of the magnetic layer may be made to be about 10 to 20 nm.

As described above, electrostatic discharge damage to and excessive wear on magnetoresistive heads can be prevented by forming the magnetic layer with a thickness of 10 to 200 nm and the carbon protection film with a thickness of about 3 to 50 nm in a cleaning tape in which a magnetic layer is formed as the metal evaporated film. Also, sufficient cleaning effects can be achieved while suppressing head wear within a tolerable range by forming the surface protrusions on the cleaning tape with particles with a particle diameter of 35 nm±5 nm and at a density of 300×10$^4$ to 1500×10$^4$ per mm$^2$.

EXAMPLE 5

Figure 20:
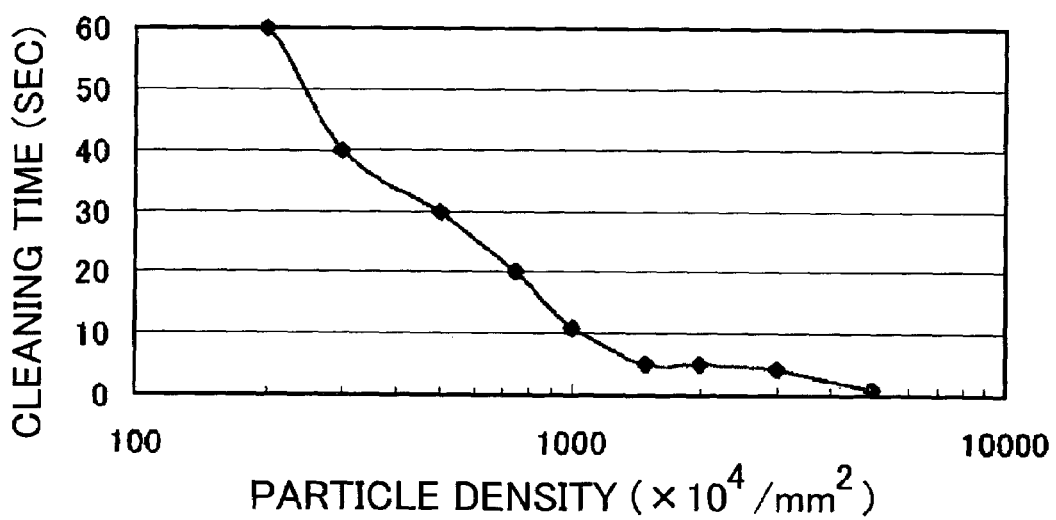
FIG. 20 is a characteristic graph related to example 5 of the present invention and shows the relationship between particle density and cleaning time when particles with a particle diameter of 25 nm±5 nm are used.
Figure 21:
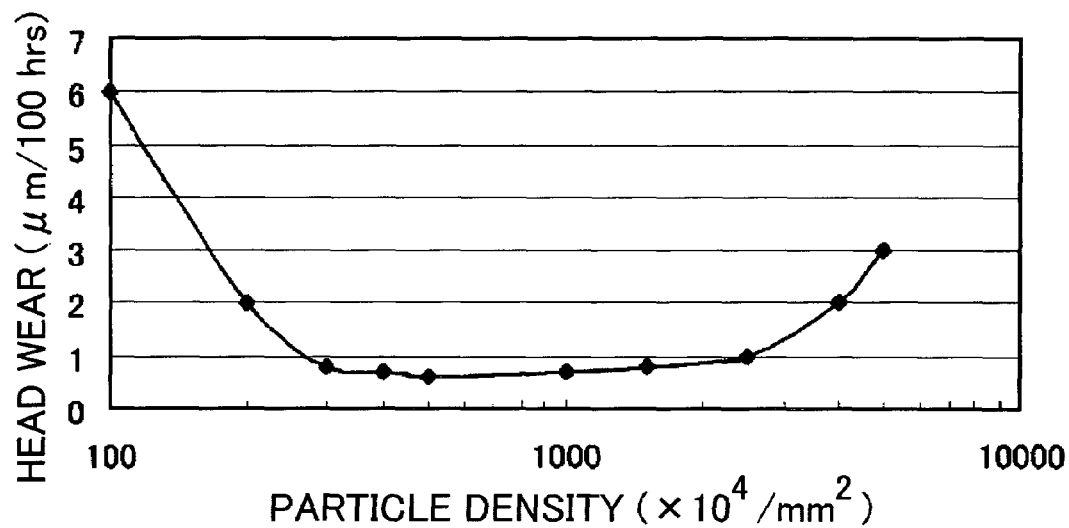
FIG. 21 is a characteristic graph related to example 5 of the present invention and shows the relationship between particle density and head wear when particles with a particle diameter of 25 nm±5 nm are used.
Figure 22:
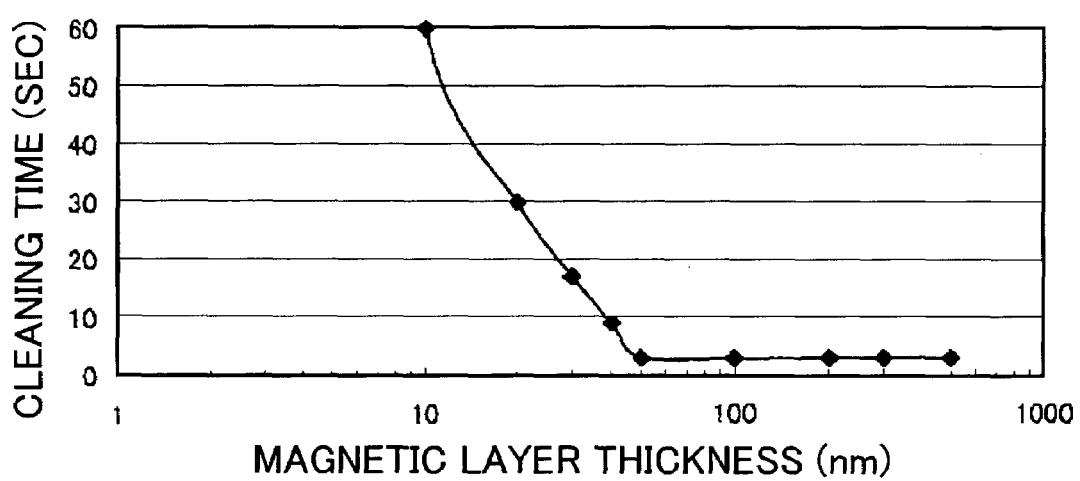
FIG. 22 is a characteristic graph related to example 5 of the present invention and shows the relationship between the thickness of a magnetic layer and cleaning time when particles with a particle diameter of 25 nm±5 nm are used.

In example 5 to 7 below, the inorganic protection film 4 shown in FIG. 1 was not formed. Examples 5, 6 and 7 show a case in which the particle size of the particles 2 is 25 nm±5 nm, a case in which the particle size of the particles 2 is made smaller (15 nm±5 nm) and a case in which the particle size of the particles 2 is made larger (35 nm±5 nm), respectively. The tolerable range of head wear and the method of evaluating cleaning effects are similar to those of example 2. FIG. 20 to FIG. 22 show measurement results in a case where particles with a particle diameter of 25 nm±5 nm were used.

FIG. 20 shows the results of analyzing the density of the surface protrusions at which sufficient cleaning effects can be obtained when the thickness of the magnetic layer 3 is 50 nm. According to the above mentioned reference cleaning time (about 10 seconds or shorter), sufficient cleaning effects are obtained when the particle density is $1000 \times 10^4$ per $mm^2$ or higher. Also, as long as the particle density is $300 \times 10^4$ per $mm^2$ or higher, the cleaning time is shorter than 40 seconds, which falls within an acceptable range.

FIG. 21 shows the results of analyzing the relationship between the density of the surface protrusions and head wear when, as in FIG. 20, the thickness of the magnetic layer 3 is 50 nm. As shown in FIG. 21, by making the particle density be in the range of $300 \times 10^4$ to $2500 \times 10^4$ per $mm^2$, head wear in relation to the period of time over which the cleaning tape is used can be kept within the above mentioned tolerable range (1 $\mu$m/100 hours).

From FIG. 20 and FIG. 21, it can be seen that by keeping the density of the surface protrusions in the range of about $1000 \times 10^4$ per $mm^2$ to $2500 \times 10^4$ per $mm^2$, both sufficient cleaning effects and low abrasiveness can be achieved simultaneously. If low abrasiveness is prioritized, the lower limit for the density of the surface protrusions may be made to be about $300 \times 10^4$ per $mm^2$. When the particle density deviates from the range above, a good balance between cleaning effects and low abrasiveness cannot be maintained.

FIG. 22 shows the results of analyzing the relationship between the thickness of the magnetic layer and cleaning effects when the thickness of the magnetic layer is 50 nm and the density of the surface protrusions is $1500 \times 10^4$ per $mm^2$. As shown in FIG. 22, the reference cleaning time (about 5 seconds) is obtained when the thickness of the magnetic layer is 50 nm or greater.

Although not shown, when the inorganic protection film (for example, the carbon protection film) is not provided, as the magnetic layer becomes thicker, the electrical resistivity of the cleaning tape becomes lower as in FIG. 4. In other words, magnetoresistive heads become more susceptible to electrostatic discharge damage due to external leakage current. On the contrary, when the magnetic layer is made as thin as about 10 nm, the electrical resistivity of the cleaning tape can be increased within a range in which electrostatic discharge damage due to static buildup in the cleaning tape itself can be prevented.

As shown in FIG. 22, the cleaning time when the thickness of the magnetic layer is 10 nm and 20 nm is 60 seconds and 30 seconds, respectively. These values are not impractical provided that cleaning is carried out over a plurality of times. Accordingly, in a case where it is desired that the electrical resistivity be increased to, for example, about $1 \times 10^6$ $\Omega$/inch$^2$, or ideally to about $1 \times 10^7$ $\Omega$/inch$^2$ as with a cleaning tape for, for example, GMR heads, one can still be used as a cleaning tape even if the magnetic layer is as thin as about 10 nm. Although not shown, as the magnetic layer becomes thinner, head wear tends to decrease. If electrical resistivity is prioritized, the thickness of the magnetic layer may be made to be about 10 to 20 nm.

As described above, electrostatic discharge damage to and excessive wear on magnetoresistive heads can be prevented by making the thickness of the magnetic layer be 10 to 200 nm in a cleaning tape in which the magnetic layer is formed as the metal evaporated film. Also, sufficient cleaning effects can be obtained while suppressing head wear within a tolerable range by forming surface protrusions on the cleaning tape with particles with a particle diameter of 25 nm±5 nm and at a density of $300 \times 10^4$ to $2500 \times 10^4$ per $mm^2$, or preferably of $1000 \times 10^4$ to $2500 \times 10^4$ per $mm^2$.

EXAMPLE 6

Figure 23:
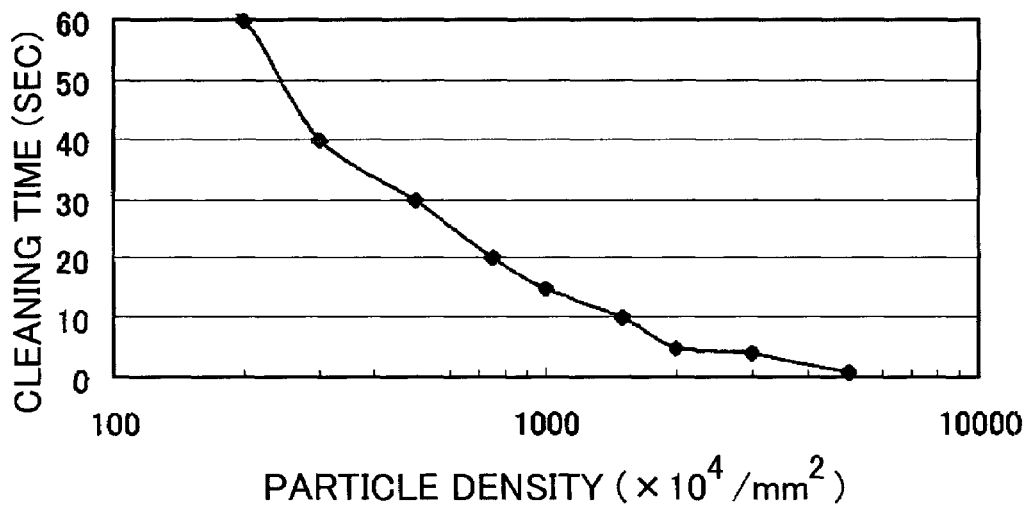
FIG. 23 is a characteristic graph related to example 6 of the present invention and shows the relationship between particle density and cleaning time when particles with a particle diameter of 15 nm±5 nm are used.
Figure 24:
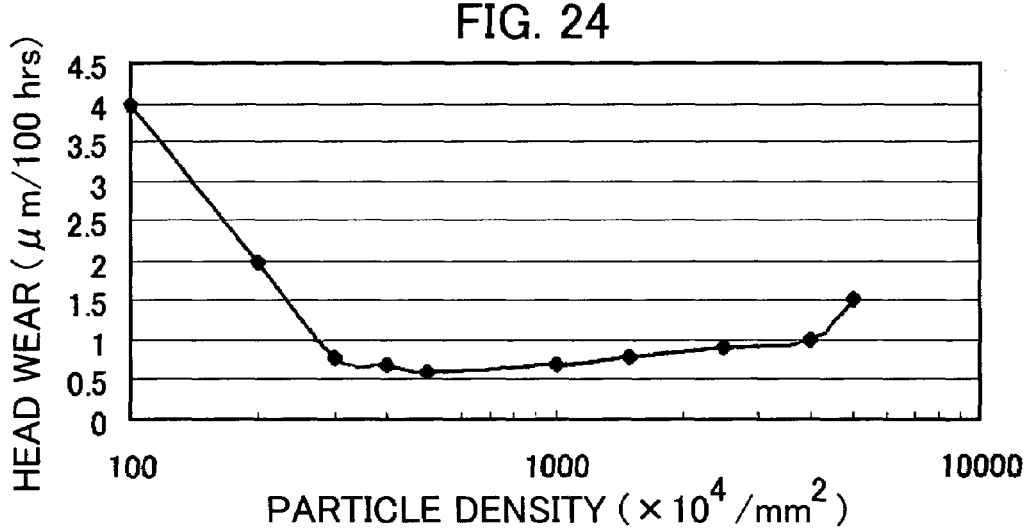
FIG. 24 is a characteristic graph related to example 6 of the present invention and shows the relationship between particle density and head wear when particles with a particle diameter of 15 nm±5 nm are used.

Cleaning tapes were prepared in a manner similar to example 5 described above except in that the particle diameter of the particles 2 was changed to 15 nm±5 nm, and various measurements were taken. FIG. 23 and FIG. 24 show measurement results in cases where particles with a particle diameter of 15 nm±5 nm were used.

FIG. 23 shows the results of analyzing the density of the surface protrusions at which sufficient cleaning can be obtained when the thickness of the magnetic layer 3 is 50 nm. According to the above mentioned reference cleaning time (about 10 seconds or shorter), sufficient cleaning effects are obtained when the particle density is $1500 \times 10^4$ per $mm^2$ or higher. Also, as long as the particle density is $300 \times 10^4$ per $mm^2$ or higher, the cleaning time is 40 seconds or shorter, which is within an acceptable range.

FIG. 24 shows the results of analyzing the relationship between the density of the surface protrusions and head wear when, as in FIG. 23, the thickness of the magnetic layer 3 is 50 nm. As shown in FIG. 24, by making the particle density be in the range of $300 \times 10^4$ per $mm^2$ to $4000 \times 10^4$ per $mm^2$, head wear in relation to the period of time over which the cleaning tape is used can be kept within the above mentioned tolerable range (1 $\mu$m/100 hours).

From FIG. 23 and FIG. 24, it can be seen that by making the density of the surface protrusions be in the range of about $1500 \times 10^4$ per $mm^2$ to $4000 \times 10^4$ per $mm^2$, both sufficient cleaning effects and low abrasiveness can be achieved simultaneously. If low abrasiveness is prioritized, the lower limit of the density of the surface protrusions may be taken to be about $300 \times 10^4$ per $mm^2$. If the particle density deviates from the range above, a good balance between cleaning effects and low abrasiveness cannot be maintained. Although not shown, even when the particle diameter of the particles is changed to 15 nm±5 nm, the cleaning time remains within a tolerable range when the thickness of the magnetic layer is in the range of 10 to 200 nm as in FIG. 22 of example 5.

As described above, electrostatic discharge damage to and excessive wear on magnetoresistive heads can be prevented by forming the magnetic layer with a thickness of 10 to 200 nm in a cleaning tape in which the magnetic layer is formed as the metal evaporated film. Also, sufficient cleaning effects can be obtained while suppressing head wear within a tolerable range by forming surface protrusions on the cleaning tapes with particles having a particle diameter of 15 nm±5 nm and at a density of $300 \times 10^4$ to $4000 \times 10^4$ per $mm^2$, or preferably of $1500 \times 10^4$ to $4000 \times 10^4$ per $mm^2$.

EXAMPLE 7

Figure 25:
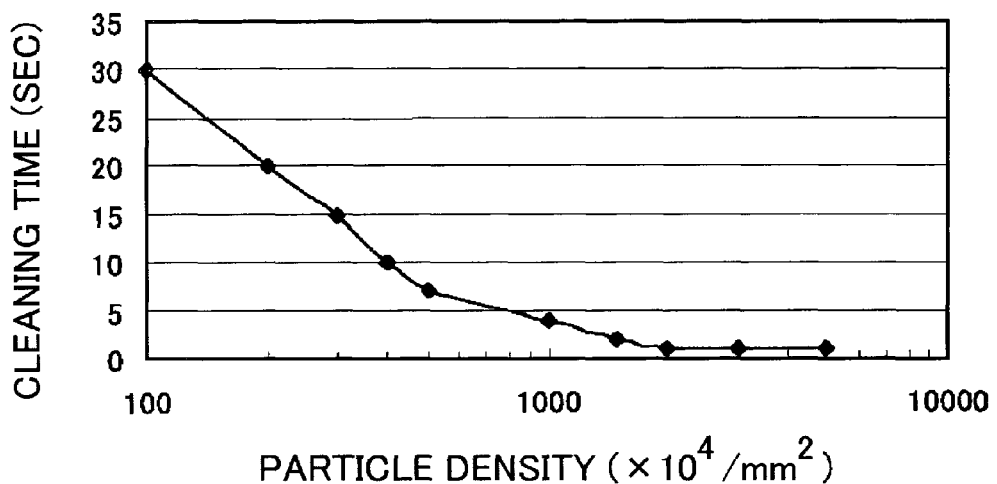
FIG. 25 is a characteristic graph related to example 7 of the present invention and shows the relationship between particle density and cleaning time when particles with a particle diameter of 35 nm±5 nm are used.
Figure 26:
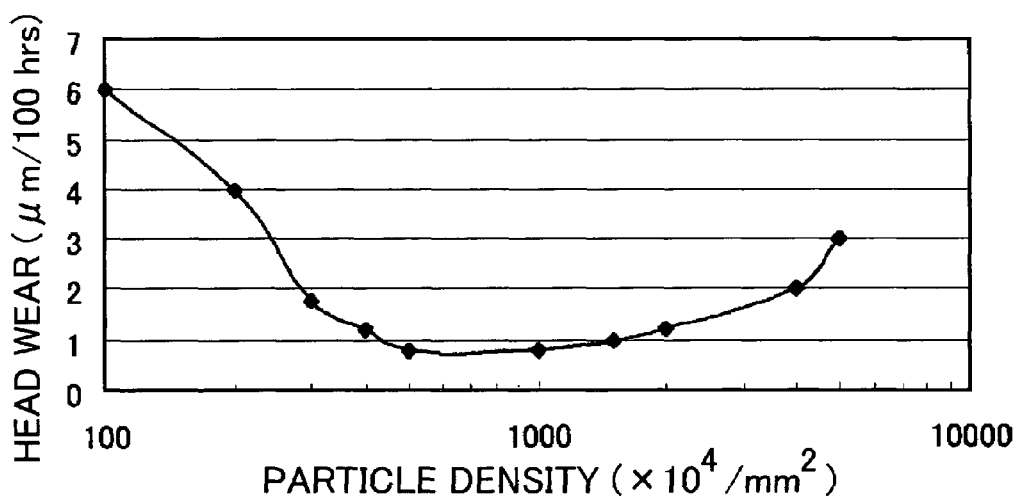
FIG. 26 is a characteristic graph related to example 7 of the present invention and shows the relationship between particle density and head wear when particles with a particle diameter of 35 nm±5 nm are used.

In this example, cleaning tapes were prepared in a manner similar to example 5 described above except in that the particle diameter of the particles 2 was changed to 35 nm±5 nm, and various measurements were taken. FIG. 25 and FIG. 26 show measurement results when particles with a particle diameter of 35 nm±5 nm were used.

FIG. 25 shows the results of analyzing the density of the surface protrusions at which sufficient cleaning effects are obtained when the thickness of the magnetic layer 3 is 50 nm. According to the above mentioned reference cleaning time (about 10 seconds or shorter), sufficient cleaning effects are obtained when the particle density is 400×10$^4$ per mm$^2$ or higher. However, once the particle density exceeds 1000×10$^4$ per mm$^2$, the cleaning time becomes too short.

FIG. 26 shows the results of analyzing the relationship between the density of the surface protrusions and head wear when, as in FIG. 25, the thickness of the magnetic layer 3 is 50 nm. As shown in FIG. 26, by making the particle density be in the range of 500×10$^4$ to 1500×10$^4$ per mm$^2$, head wear in relation to the period of time over which the cleaning tape is used can be kept within the above mentioned tolerable range (1 μm/100 hours).

From FIG. 25 and FIG. 26, it can be seen that by making the density of the surface protrusions be in the range of about 500×10$^4$ per mm$^2$ to 1000×10$^4$ per mm$^2$, both sufficient cleaning effects and low abrasiveness can be achieved simultaneously. If the particle density deviates from the range above, a good balance between cleaning effects and low abrasiveness cannot be maintained. Although not shown, even if the diameter of the particles is changed to 35 nm±5 nm, the cleaning time is within the tolerable range when the thickness of the magnetic layer is in the range of 10 to 200 nm as in FIG. 22 of example 5.

As described above, electrostatic discharge damage to and excessive wear on magnetoresistive heads can be prevented by forming the magnetic layer with a thickness of 10 to 200 nm in a cleaning tape in which the magnetic layer is formed as the metal evaporated film. Also, sufficient cleaning effects can be obtained while suppressing head wear within a tolerable range by forming surface protrusions on the cleaning tape with particles having a particle diameter of 35 nm±5 nm and at a density of 500×10$^4$ to 1500×10$^4$ per mm$^2$.

EXAMPLE 8

In examples 8 and 9 below, a non-magnetic electrically conductive layer made of Al (hereinafter referred to as Al layer) was formed as the metal evaporated film 3. In example 8, a cleaning tape in which particles 2 shown in FIG. 1 were not included and, thus, which has no surface protrusions 6 was prepared and measurement results of the electrical resistivity are shown.

Figure 27:
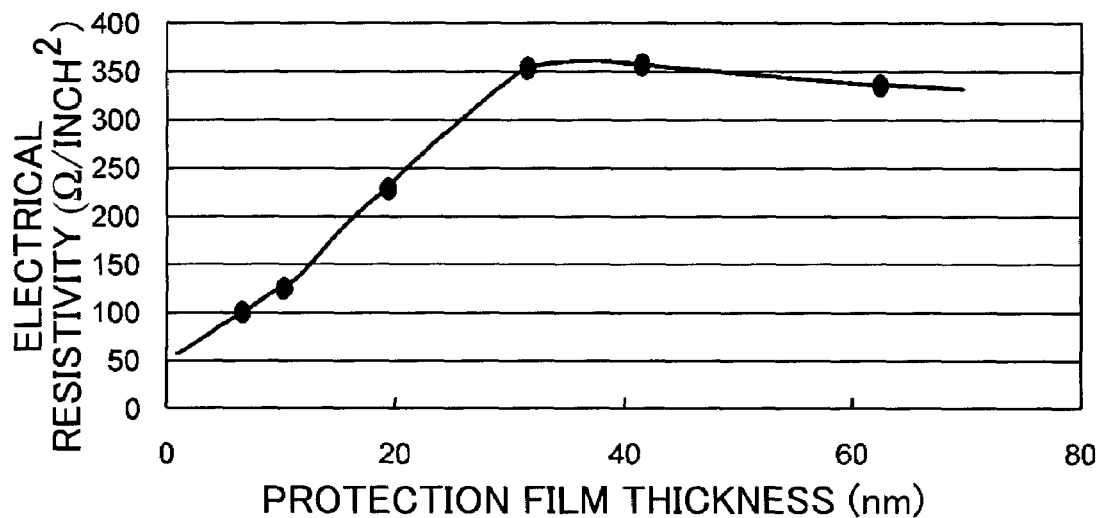
FIG. 27 is a characteristic graph related to example 8 of the present invention and shows the relationship between the thickness and electrical resistivity of a carbon protection film.

FIG. 27 shows the relationship between the thickness of the carbon protection film, which is the inorganic protection film 4, and the electrical resistivity of the surface of the cleaning tape. When the thickness of the Al layer is made to be 150 nm, and the thickness of the carbon protection film is varied, electrical resistivity becomes greatest when the thickness of the carbon protection film is 35 nm.

Figure 28:
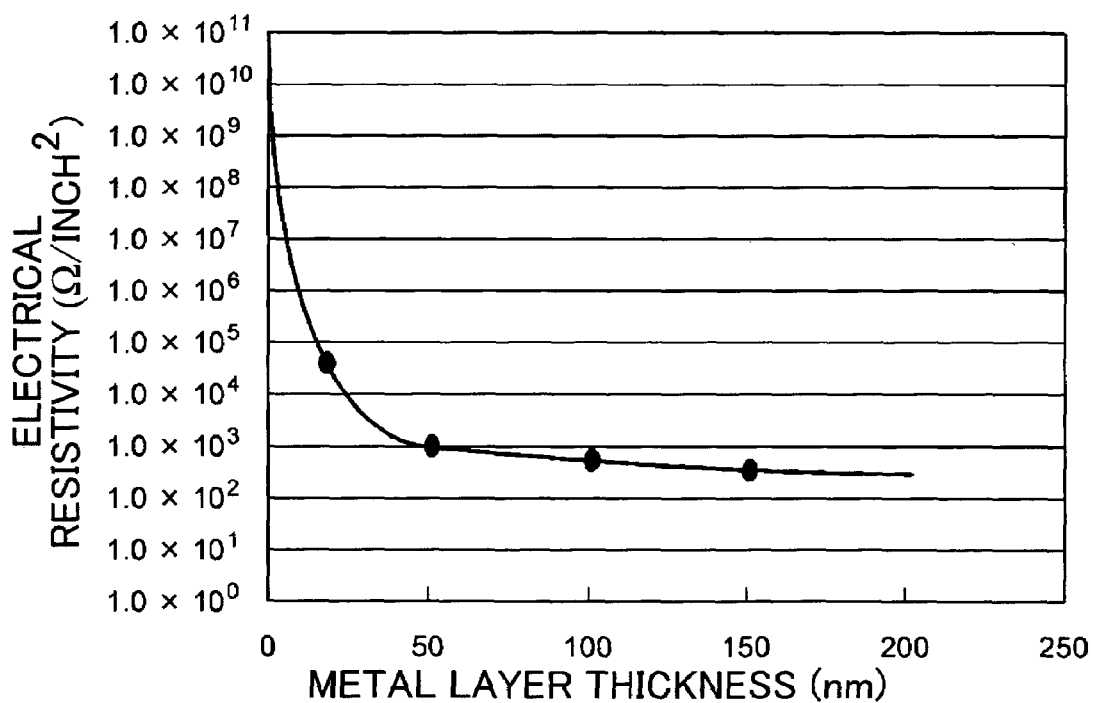
FIG. 28 is a characteristic graph related to example 8 of the present invention and shows the relationship between the thickness and electrical resistivity of an Al layer.

With this particular thickness (35 nm) of the carbon protection film, measurement results of the electrical resistivity when the thickness of the Al layer 3 is varied are shown in FIG. 28. As shown in FIG. 28, electrical resistivity decreases as the Al layer 3 becomes thicker. With the PET film alone (i.e., when the thickness of the Al layer 3 is 0 nm), electrical resistivity becomes 1×10$^{11}$ Ω/inch$^2$ or greater. When the thickness of the Al layer 3 is 50 nm, electrical resistivity is 1×10$^3$ Ω/inch$^2$.

Accordingly, it can be seen that even when the thickness of the carbon protection film is such that electrical resistivity is greatest (i.e., 35 nm), in order to prevent electrostatic discharge damage to magnetoresistive heads due to static buildup in the cleaning tape itself, the thickness of the Al layer 3 has to be at least several nm. Also, it can be seen that if electrostatic discharge damage to magnetoresistive heads due to external leakage current is to be prevented, the upper limit of the thickness of the Al layer 3 is about 50 nm.

If the metal evaporated layer 3 is made from other metals such as, for example, Cu, W, Mo, Mg, Fe, Ni or an alloy thereof, the thickness of the metal evaporated film 3 is changed depending on the electrical resistivity of these metals or alloys such that the electrical resistivity of the cleaning tape falls within a desired range.

EXAMPLE 9

In example 9 below, as shown in FIG. 1, the carbon protection film was formed as the inorganic protection film 4 on the Al layer, which is the metal evaporated film 3. The carbon protection film 4 was formed through sputtering. Protrusions were formed on the surface of the Al layer 3 by arranging the particles 2 with a particle diameter of 25 nm±5 nm on the non-magnetic substrate 1.

Figure 29:
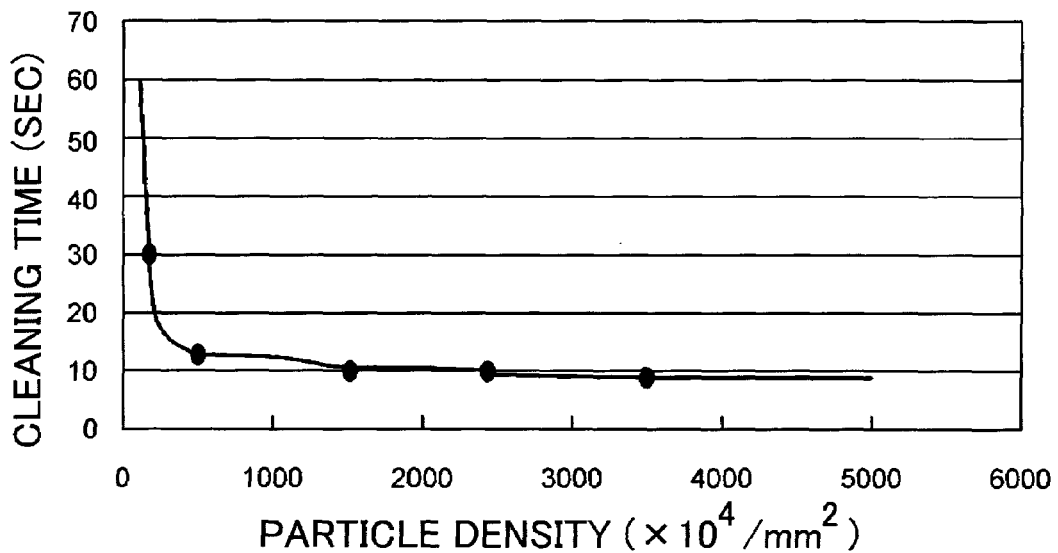
FIG. 29 is a characteristic graph related to example 9 of the present invention and shows the relationship between particle density and cleaning time when particles with a particle diameter of 25 nm±5 nm are used.

Measurement results with respect to the cleaning tape of example 9 will be described with reference to FIG. 29 to FIG. 32. FIG. 29 shows the results of analyzing the density of the surface protrusions at which sufficient cleaning effects are obtained when the thickness of the Al layer 3 is 50 nm and the thickness of the carbon protection film is 10 nm.

According to the above mentioned reference cleaning time (about 10 seconds or shorter), sufficient cleaning effects are obtained when the particle density is in the range of 500×10$^4$ per mm$^2$ to 5000×10$^4$ per mm$^2$.

Figure 30:
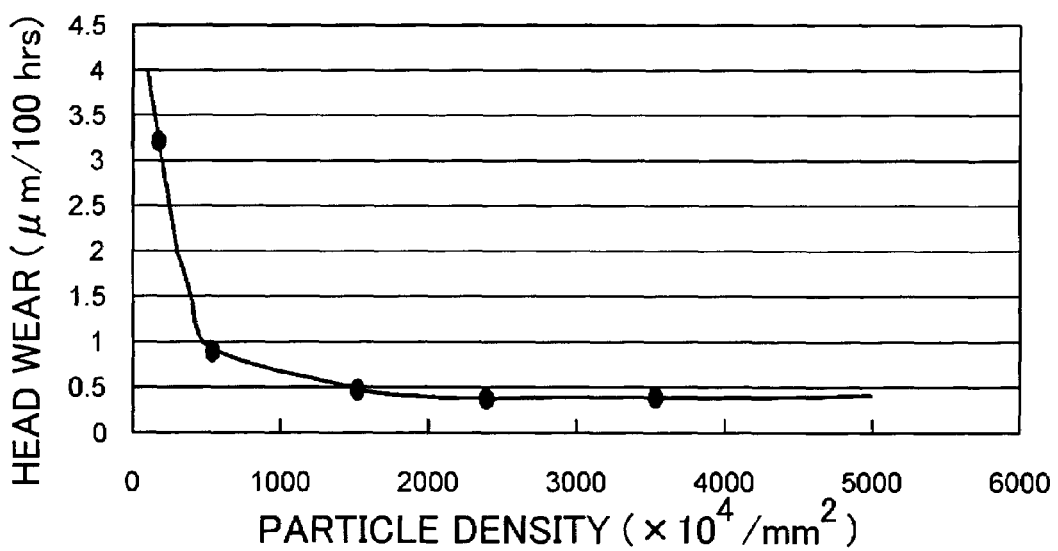
FIG. 30 is a characteristic graph related to example 9 of the present invention and shows the relationship between particle density and head wear when particles with a particle diameter of 25 nm±5 nm are used.

FIG. 30 shows the results of analyzing the relationship between the density of the surface protrusions and head wear, when, as in FIG. 29, the thickness of the Al layer 3 is 50 nm and the thickness of the carbon protection film is 10 nm. As shown in FIG. 30, by making the particle density be in the range of 500×10$^4$ per mm$^2$ to 5000×10$^4$ per mm$^2$, head wear in relation to the period of time the cleaning tape is used can be kept within the above mentioned tolerable range (1 μm/100 hours).

From FIG. 29 and FIG. 30, it can be seen that by making the density of the surface protrusions be in the range of about 500×10$^4$ per mm$^2$ to 5000×10$^4$ per mm$^2$, both sufficient cleaning effects and low abrasiveness can be achieved simultaneously. If the particle density deviates from the range above, a good balance between cleaning effects and low abrasiveness cannot be maintained.

Figure 31:
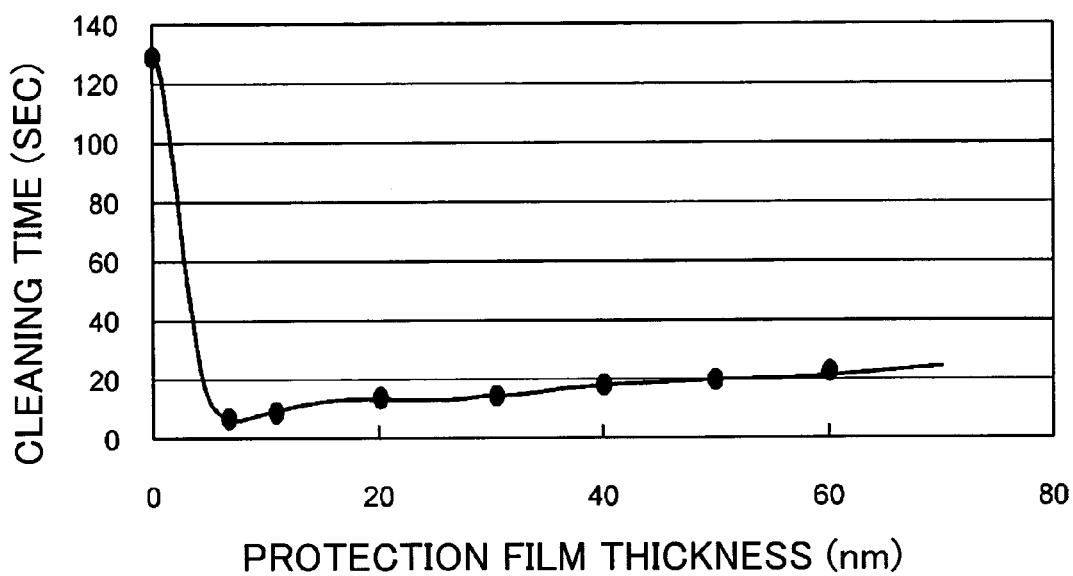
FIG. 31 is a characteristic graph related to example 9 of the present invention and shows the relationship between the thickness of a carbon protection film and cleaning time when particles with a particle diameter of 25 nm±5 nm are used.

FIG. 31 shows the results of analyzing the relationship between the thickness of the carbon protection film and cleaning effects when the thickness of the Al layer 3 is 50 nm and the density of the surface protrusions is 500×10$^4$ per mm$^2$. As shown in FIG. 31, the reference cleaning time (5 to 10 seconds) is achieved when the thickness of the carbon protection film is in the range of about 3 nm to 15 nm. As the carbon protection film becomes thicker, the cleaning time increases slightly and cleaning effects are slightly compromised.

Figure 32:
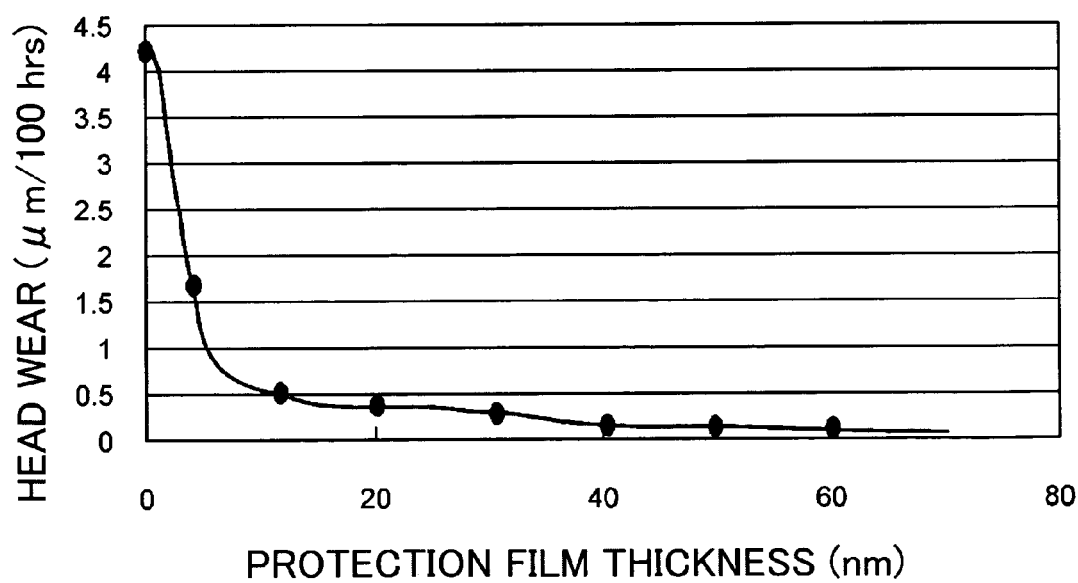
FIG. 32 is a characteristic graph related to example 9 of the present invention and shows the relationship between the thickness of a carbon protection film and head wear when particles with a particle diameter of 25 nm±5 nm are used.

FIG. 32 shows the results of analyzing the relationship between the thickness of the carbon protection film and head wear when, as in FIG. 31, the thickness of the Al layer 3 is 50 nm and the density of the surface protrusions is 500×10$^4$ per mm$^2$. As FIG. 32 shows, head wear is 1 μm/100 hours when the thickness of the carbon protection film is about 3 nm and head wear decreases as the carbon protection film becomes thicker. It can be seen that by making the thickness of the carbon protection film be 3 nm or greater, head wear in relation to the period of time the cleaning tape is used can be kept within the above mentioned tolerable range (1 μm/100 hours).

From FIG. 31 and FIG. 32, it can be seen that by keeping the thickness of the carbon protection film within the range of about 3 nm to 15 nm, both sufficient cleaning effects and low abrasiveness can be achieved simultaneously. However, if head wear, in particular, needs to be kept low, the carbon protection film may be made thicker and the cleaning time longer. Although head wear decreases as the carbon protection film becomes thicker, cleaning effects are slightly compromised. Accordingly, the thickness of the carbon protection film should be set taking the balance between cleaning effects and low abrasiveness into consideration.

Although not shown in drawing, when the relationship between the thickness of the Al layer and cleaning effects were studied where the thickness of the Al layer 3 was 50 nm, the density of the surface protrusions was $500 \times 10^4$ per $mm^2$ and the thickness of the carbon protection film was 10 nm, results that were generally similar to those with respect to the magnetic layer shown in FIG. 9 were obtained. In other words, the reference cleaning time (about 10 seconds or shorter) was achieved when the thickness of the Al layer was about 50 nm, and as the Al layer was made thicker, cleaning effects were further enhanced.

However, as shown in FIG. 28, as the Al layer becomes thicker, the electrical resistivity of the cleaning tape decreases and magnetoresistive heads become more susceptible to electrostatic discharge damage due to external leakage current. Accordingly, as in the case where the magnetic layer is formed as the metal evaporated film, it is desirable to increase the electrical resistivity of the cleaning tape by making the Al layer thinner within a range in which electrostatic discharge damage to heads due to static buildup in the cleaning tape itself can be prevented.

As in FIG. 9, the cleaning time is 60 seconds or less when the thickness of the Al layer is 10 nm or greater. This value is not impractical provided that cleaning is carried out over a plurality of times. Although not shown in drawing, as the Al layer becomes thinner, head wear tends to decrease. If electrical resistivity is prioritized, the thickness of the Al layer may be made to be about 10 nm.

As described above, it is possible to prevent electrostatic discharge damage to and excessive head wear on magnetoresistive heads by forming the Al layer and the carbon protection film with thicknesses of 10 to 50 nm and 3 to 30 nm, respectively, in a cleaning tape in which the Al layer is formed as the metal evaporated film. Also, sufficient cleaning effects can be obtained while suppressing head wear within a tolerable range by forming surface protrusions on the cleaning tape with particles of a particle diameter of 25 nm±5 nm at a density of $500 \times 10^4$ to $5000 \times 10^4$ per $mm^2$.

Comparing the examples in which a magnetic layer was formed as the metal evaporated film (examples 1 to 7) with the examples in which an Al layer was formed as the metal evaporated film (examples 8 and 9), provided that the thicknesses of the magnetic layer and the Al layer were the same and that the thickness of the carbon protection film was the same, generally similar results were obtained except for electrical resistivity. Although not shown in drawing, the relationship between the density of the surface protrusions and cleaning time or between the density of the surface protrusions and head wear were generally similar between the examples in which a magnetic layer was formed and the examples in which an Al layer was formed.

In addition, although not shown in drawing, with cleaning tapes in which an Al layer was formed, results similar to those of cleaning tapes in which a magnetic layer was formed were obtained in cases where the particle diameter of the particles was changed to 15 nm±5 nm or 35 nm±5 nm or in which the carbon protection film was not formed.

Furthermore, when, instead of forming an Al layer as the non-magnetic electrically conductive layer, a Cu layer was formed through vacuum deposition and various measurements were taken, similar results were obtained. Also, when, instead of forming an Al layer, a W layer, a Mo layer, a Mg layer, a Fe layer or a Ni layer was formed and various measurements were taken with respect to each of the above, similar results were obtained (the relationship between the density of the particles and cleaning time or head wear) except for electrical resistivity.

According to the examples of the present embodiment of the cleaning tape described above, electrostatic discharge damage to magnetoresistive heads due to static buildup in the tape and electrostatic discharge damage to heads due to currents flowing in from outside with the tape as a conductor are prevented because the electrical resistivity of the tape is controlled appropriately. Also, sufficient cleaning effects can be obtained while maintaining head wear within a tolerable range because particle density is controlled appropriately.

It should be noted that embodiments of the cleaning tape according to the present invention are not restricted to those described hereinabove. For example, although the examples above are illustrated with cases in which the particles used have a particle diameter of 15 nm±5 nm, 25 nm±5 nm or 35 nm±5 nm, as long as head wear is kept within a tolerable range and desired cleaning effects can be obtained, the particle diameter and density may be altered as deemed appropriate.

Thus, since the invention disclosed herein may be embodied in other specific forms without departing from the spirit or general characteristics thereof, some of which forms have been indicated, the embodiments and examples described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A cleaning tape comprising:
    a non-magnetic substrate;
    surface protrusions formed over a surface of said non-magnetic substrate with particles having a particle diameter of 10 to 40 nm and at a density of $300 \times 10^4$ to $5000 \times 10^4$ per $mm^2$; and
    a metal evaporated film of a thickness of 10 to 200 nm formed over said non-magnetic substrate including said surface protrusions, said metal evaporated film includes a non-magnetic electrically conductive layer.

2. The cleaning tape of claim 1, further comprising an inorganic protection film of a thickness of 3 to 50 nm formed over said metal evaporated film.

3. The cleaning tape of claim 2, wherein said inorganic protection film includes a carbon film.

4. The cleaning tape of claim 1, wherein said non-magnetic electronically conductive layer is one of a metal layer and an alloy layer containing at least one of aluminum and copper, and the thickness of said non-magnetic electrically conductive layer is 10 to 50 nm.

5. A cleaning tape comprising:
    a non-magnetic substrate;
    surface protrusions formed over a surface of said non-magnetic substrate with particles having a particle diameter of 10 to 40 nm and at a density of $300 \times 10^4$ to $5000 \times 10^4$ per $mm^2$; and a metal evaporated film of a thickness of 10 to 200 nm formed over said non-magnetic substrate including said surface protrusions, said metal evaporated film is one of a metal layer and an alloy layer containing at least one of tungsten, molybdenum and magnesium.

6. A cleaning tape comprising:

a non-magnetic substrate:

a metal evaporated film layer formed over said non-magnetic substrate, said metal evaporated film layer includes a non-magnetic electrically conductive layer, and particles disposed in said metal evaporated film layer to create surface projections, said surface projections varying in accordance with a diameter and a density of said particles, and wherein said diameter of said particles is 10 to 40 nm and said density of said particles is $300 \times 10^4$ to $5000 \times 10^4$ per $mm^2$, and wherein said metal evaporated film is of a thickness of 10 to 200 nm.

7. A cleaning tape as defined in claim 6, further comprising an inorganic protection film formed over said metal evaporated film layer.

8. A cleaning tape as defined in claim 7, wherein said inorganic protection film is of a thickness of 3 to 50 nm.

9. A cleaning tape as defined in claim 7, wherein said inorganic protection film includes a carbon film.

10. A cleaning tape as defined in claim 6, wherein said non-magnetic electrically conductive layer is one of a metal layer and an alloy layer containing at least one of aluminum and copper, and the thickness of said non-magnetic electrically conductive layer is 10 to 50 nm.

11. A cleaning tape comprising:

a non-magnetic substrate;

particles dispersed over said non-magnetic substrate, said particles having a predetermined diameter and a predetermined density;

a metal evaporated film formed over said non-magnetic substrate and said particles, said metal evaporated film includes a non-magnetic electrically conductive layer; and surface protrusions formed aver a surface of said metal evaporated film, said surface projections varying in accordance with said predetermined diameter and said predetermined density of said particles, and wherein said predetermined diameter of said particles is 10 to 40 nm and said predetermined density of said particles is $300 \times 10^4$ to $5000 \times 10^4$ per $mm^2$, and wherein said metal evaporated film is of a thickness of 10 to 200 nm.

12. A cleaning tape as defined in claim 11, further comprising an inorganic protection film formed over said metal evaporated film.

13. A cleaning tape as defined in claim 12, wherein said inorganic protection film is of a thickness of 3 to 50 nm.

14. A cleaning tape as defined in claim 12, wherein said inorganic protection film includes a carbon film.

15. A cleaning tape as defined in claim 11, wherein said non-magnetic electrically conductive layer is one of a metal layer and an alloy layer containing at least one of aluminum and copper, and the thickness of said non-magnetic electrically conductive layer is 10 to 50 nm.

* * * * *